United States Patent
Kurobe et al.

(10) Patent No.: US 7,096,405 B2
(45) Date of Patent: Aug. 22, 2006

(54) COMMUNICATION DEVICE AND COMMUNICATION METHOD IMMUNE TO BURST ERROR, PROGRAM FOR EXECUTING THE METHOD, AND COMPUTER-READABLE STORAGE MEDIUM STORING THE PROGRAM

(75) Inventors: Akio Kurobe, Tondabayashi (JP); Shigeo Yoshida, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 517 days.

(21) Appl. No.: 10/690,561

(22) Filed: Oct. 23, 2003

(65) Prior Publication Data
US 2004/0128609 A1    Jul. 1, 2004

(30) Foreign Application Priority Data
Oct. 24, 2002    (JP)    ............................ 2002-309339

(51) Int. Cl.
  H04L 1/08    (2006.01)
  H03M 13/05    (2006.01)
(52) U.S. Cl. ....................... 714/762; 714/776
(58) Field of Classification Search ................ 714/762, 714/776
  See application file for complete search history.

(56) References Cited

U.S. PATENT DOCUMENTS

| | | | |
|---|---|---|---|
| 6,119,263 A * | 9/2000 | Mowbray et al. ........... | 714/776 |
| 6,850,519 B1 * | 2/2005 | Saito et al. ................ | 370/389 |
| 2002/0069380 A1 * | 6/2002 | El-Maleh et al. ............ | 714/704 |
| 2004/0028076 A1 * | 2/2004 | Strolle et al. ............... | 370/466 |

FOREIGN PATENT DOCUMENTS

JP    11-266190    9/1999

\* cited by examiner

Primary Examiner—R. Stephen Dildine
(74) Attorney, Agent, or Firm—Wenderoth, Lind & Ponack, L.L.P.

(57) ABSTRACT

A communication device capable of correcting a burst error exceeding a correcting capability of an error correcting code by only transmitting one packet. With respect to data to be transmitted, a frame generating section 22 generates a frame for which an error detecting process, etc., is performed. A frame dividing section 23 divides the generated frame, by a predetermined number, into a plurality of divided frames. A transmission control section 24 generates a packet in which the plurality of divided frame are copied predetermined times. A transmitting section 25 sends the packet to a receiver. A receiving section 35 receives the packet transmitted from a transmitter. A reception control section 34 divides the received packet by the predetermined number. A frame reconstructing section 33 reconstructs the frame by assembling the divided frames in predetermined order. A frame processing section 32 performs an error correcting process, etc., for the reconstructed frame.

27 Claims, 19 Drawing Sheets

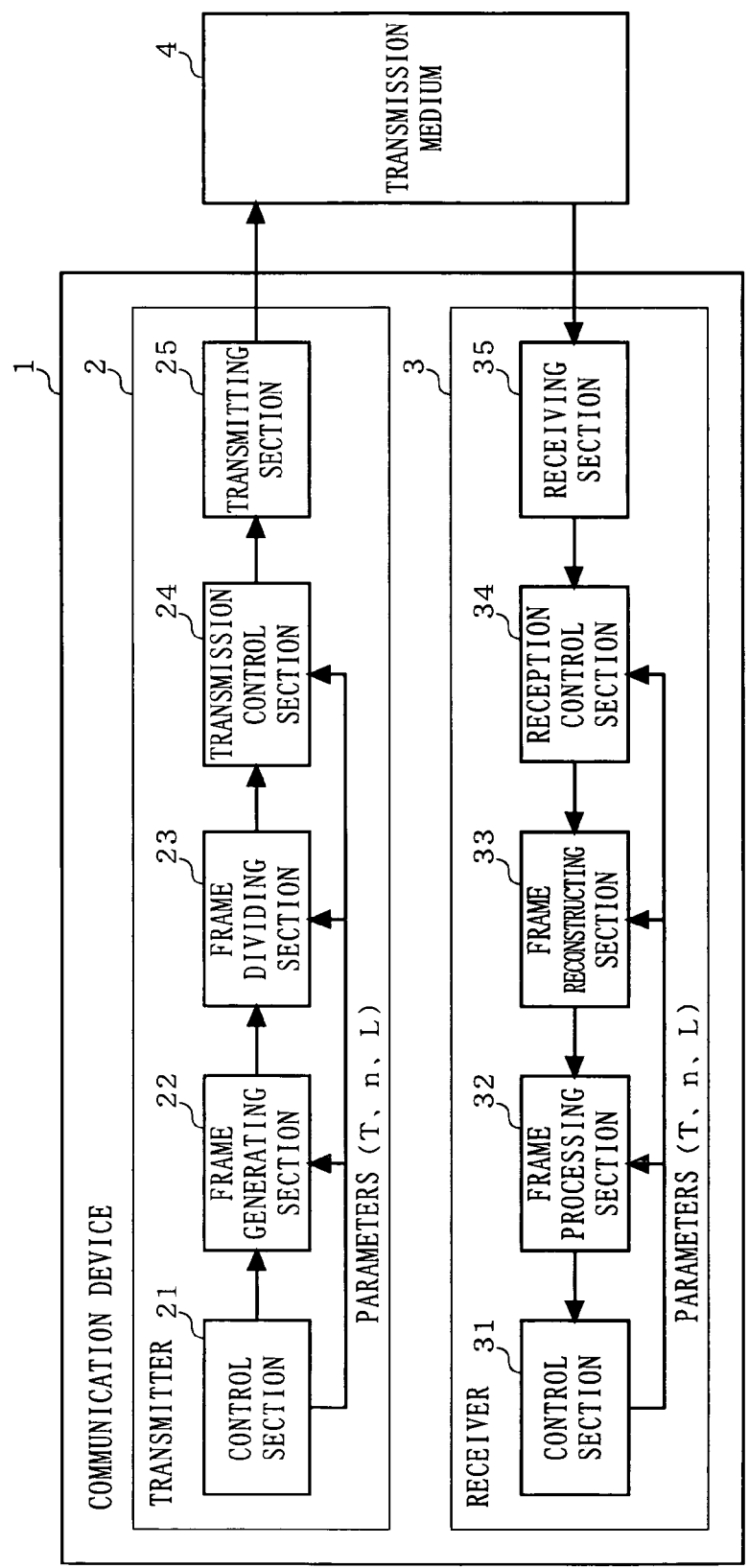
F I G. 1

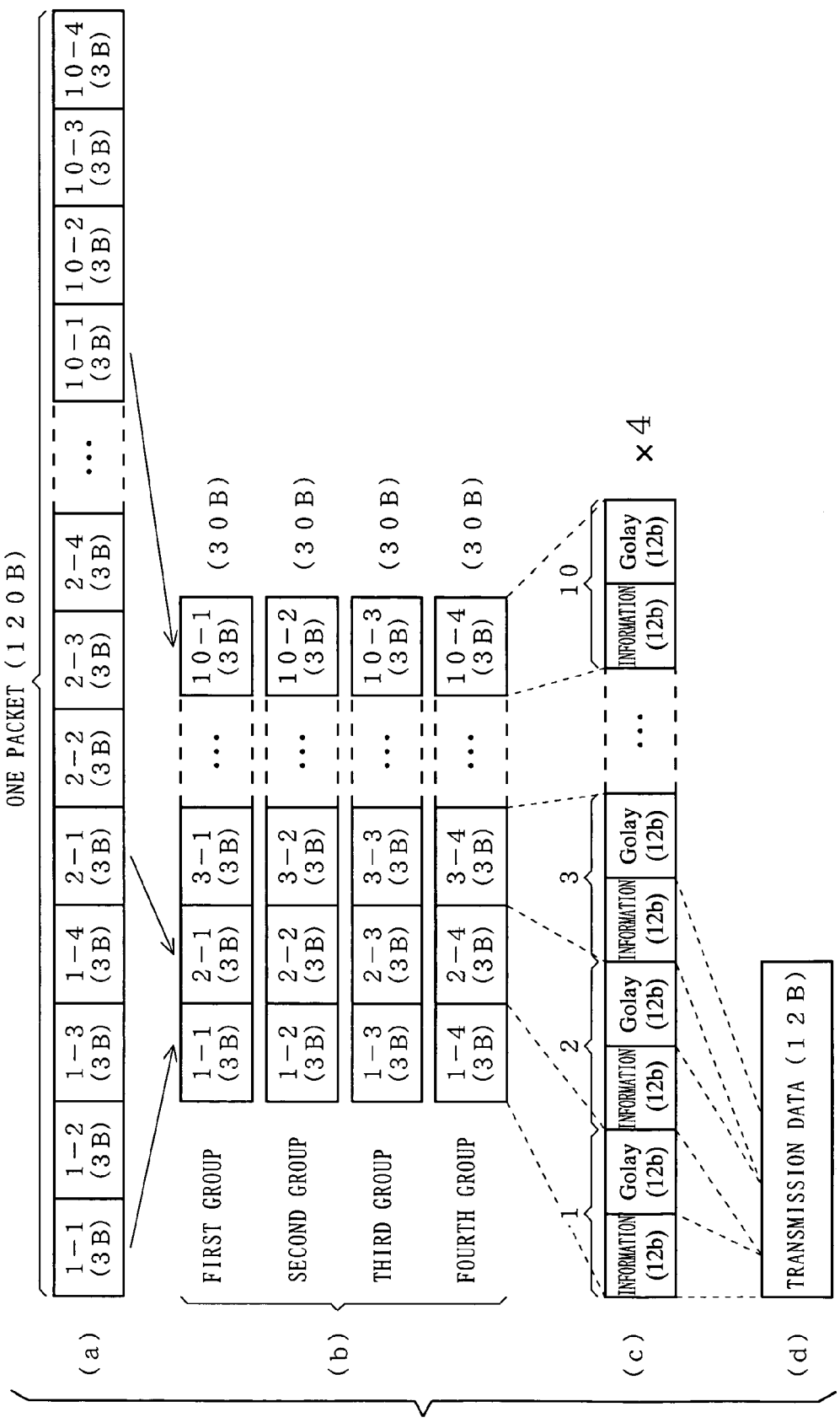
F I G. 5

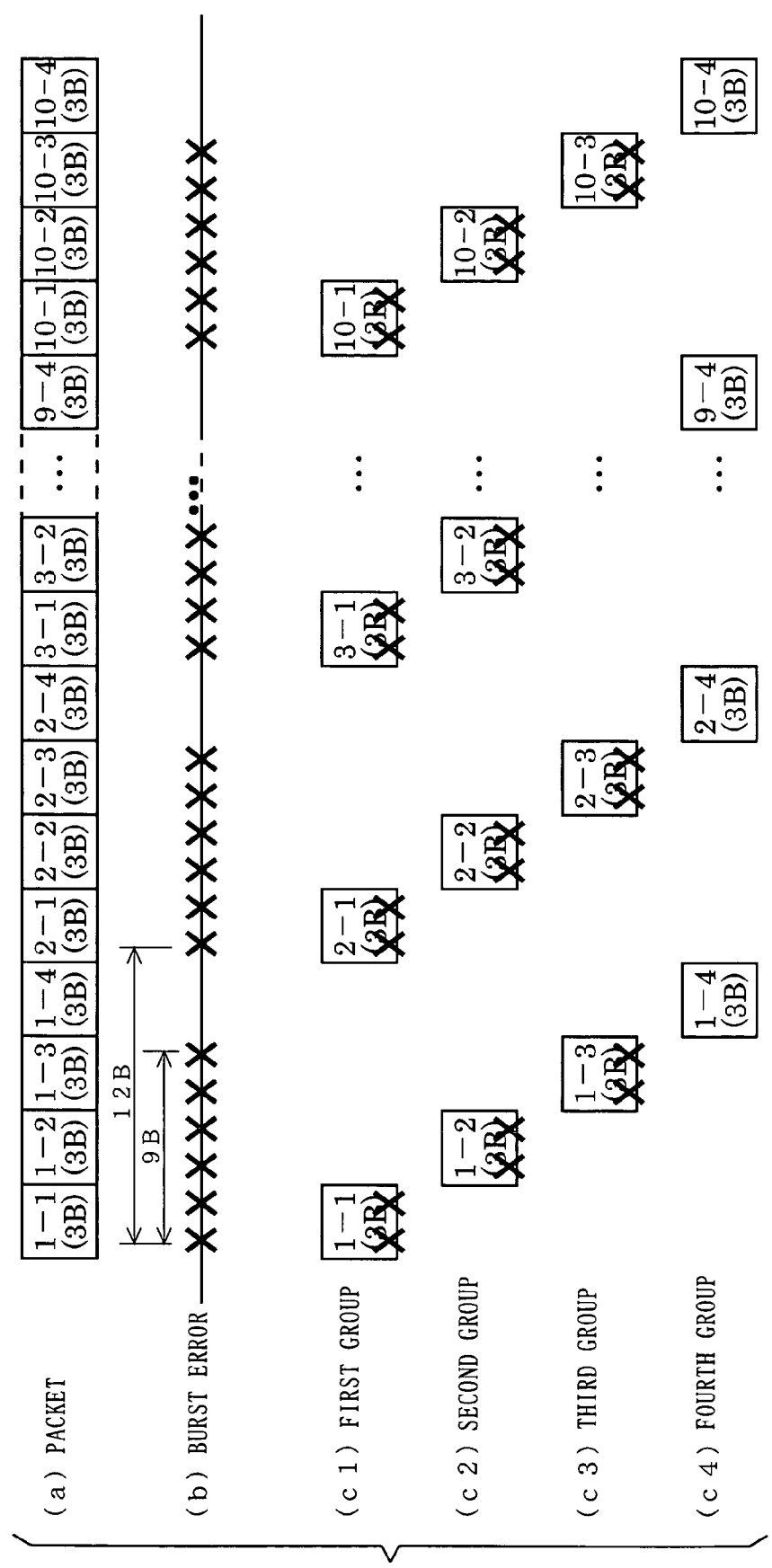

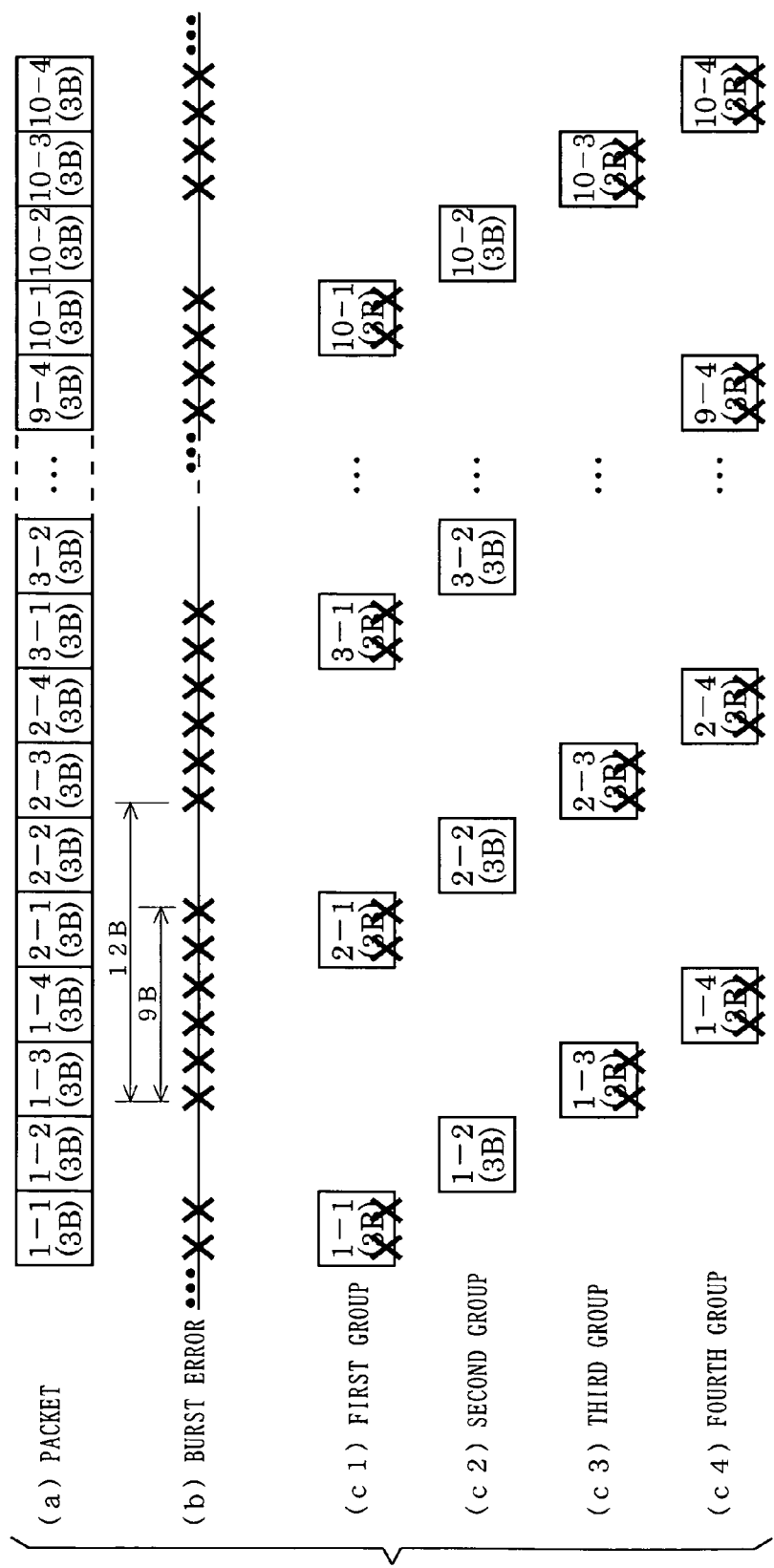

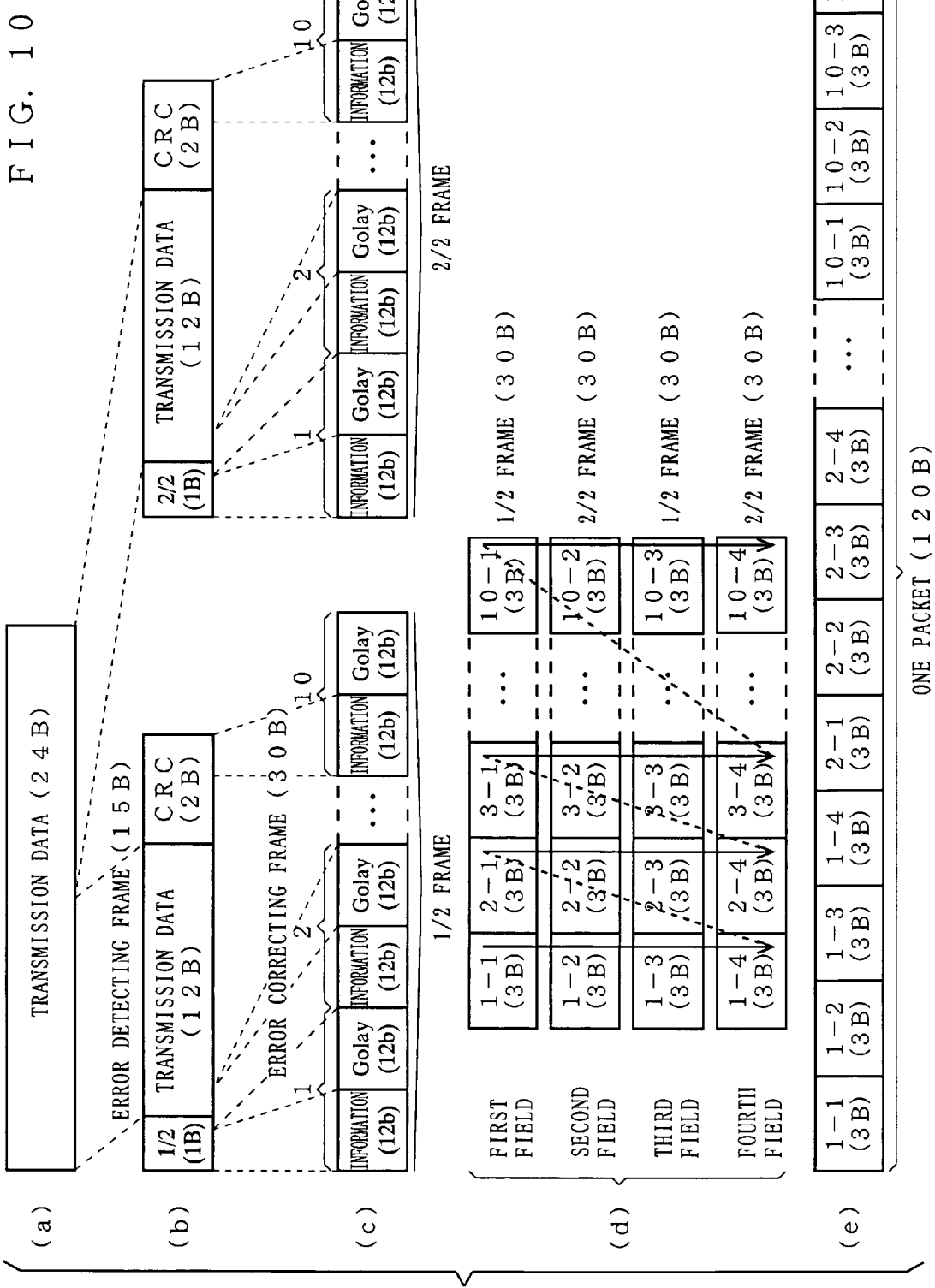

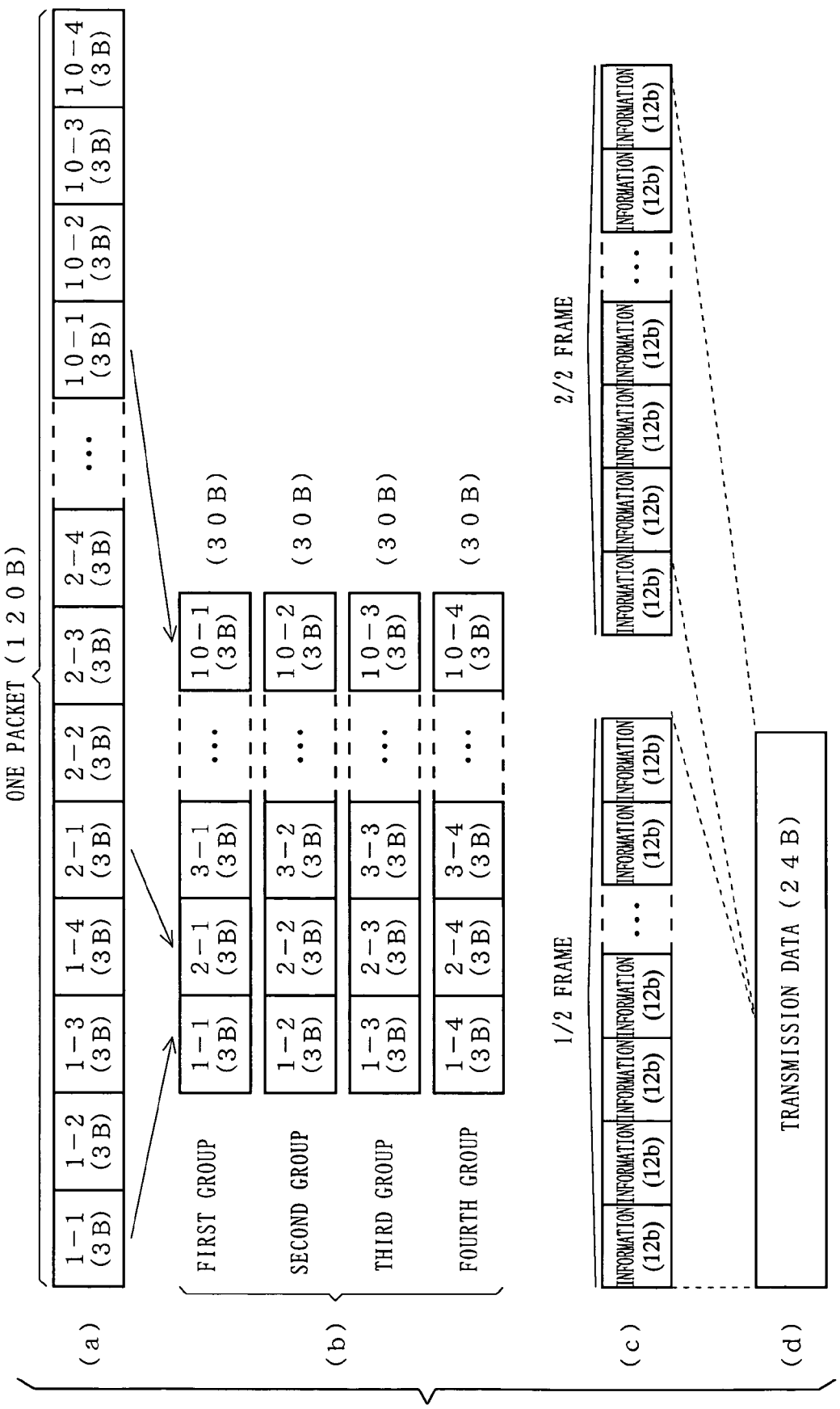

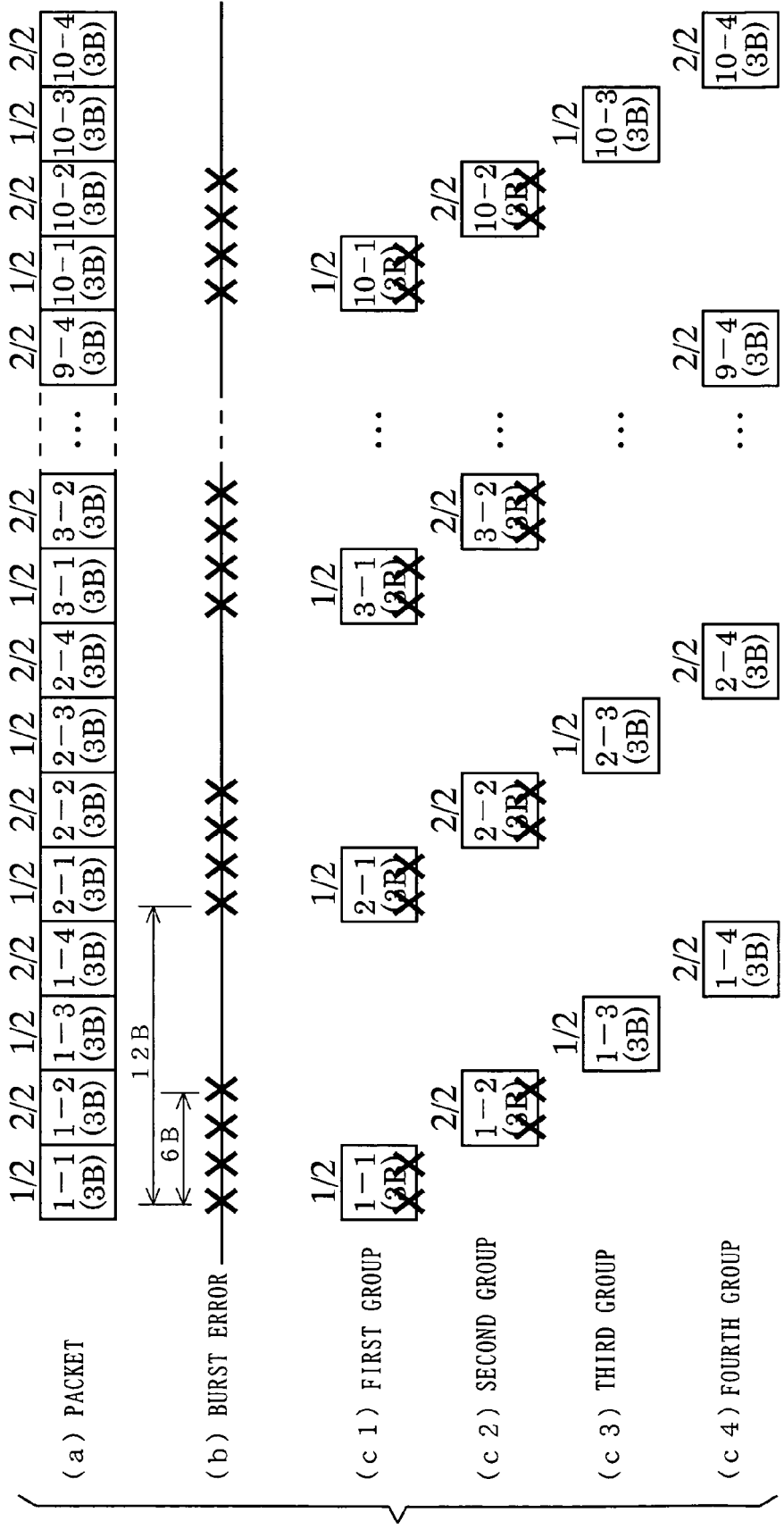

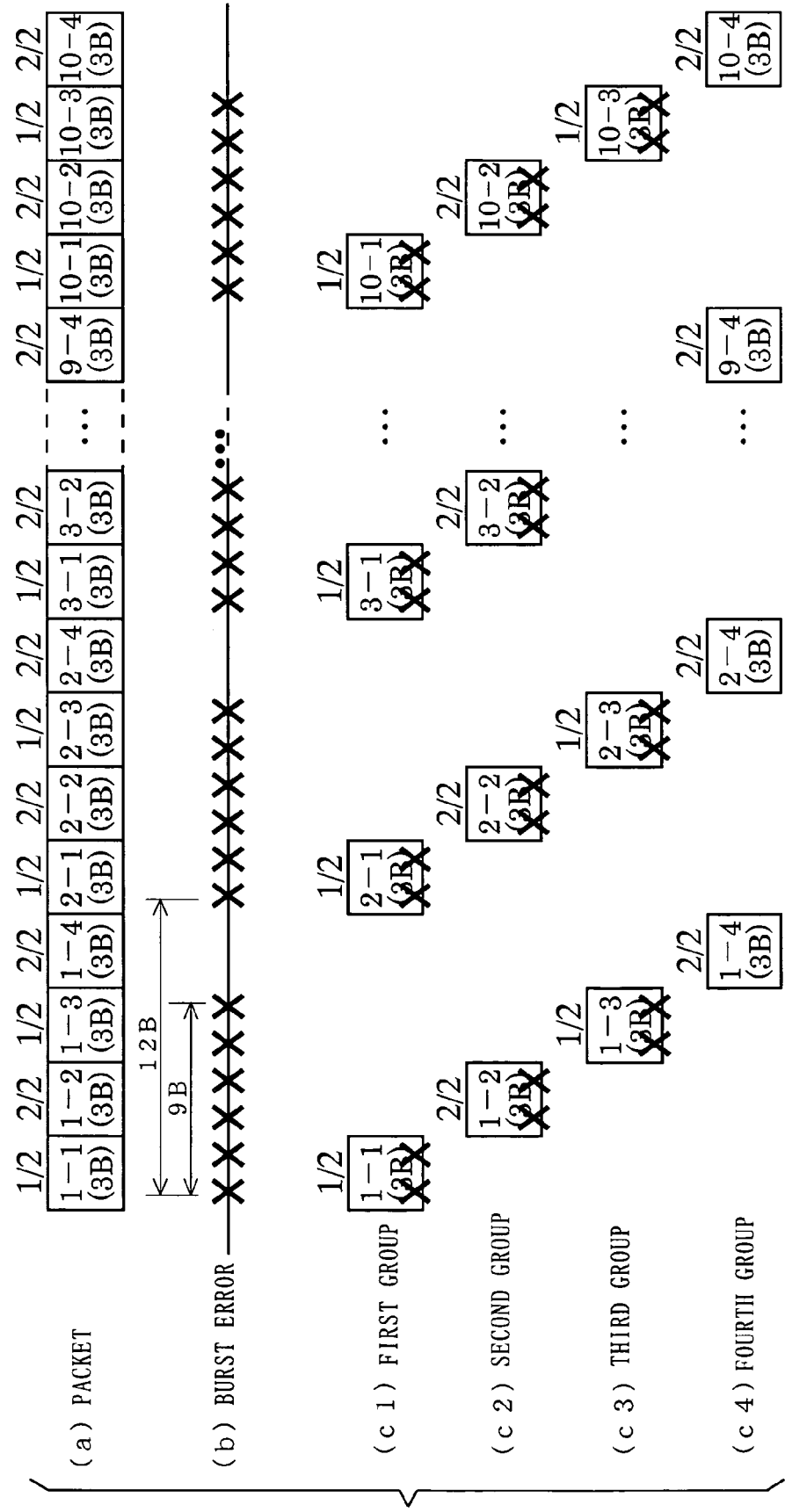

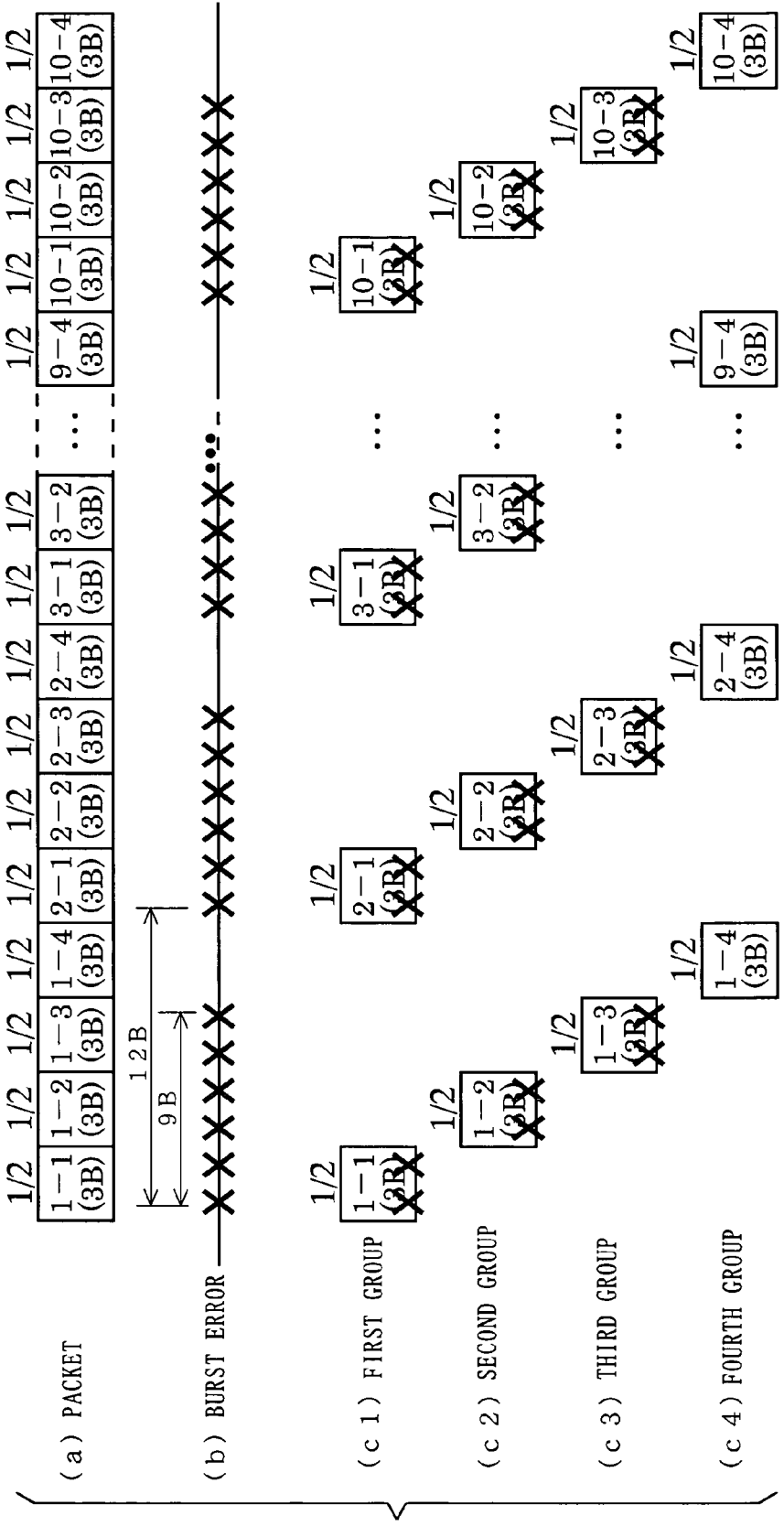

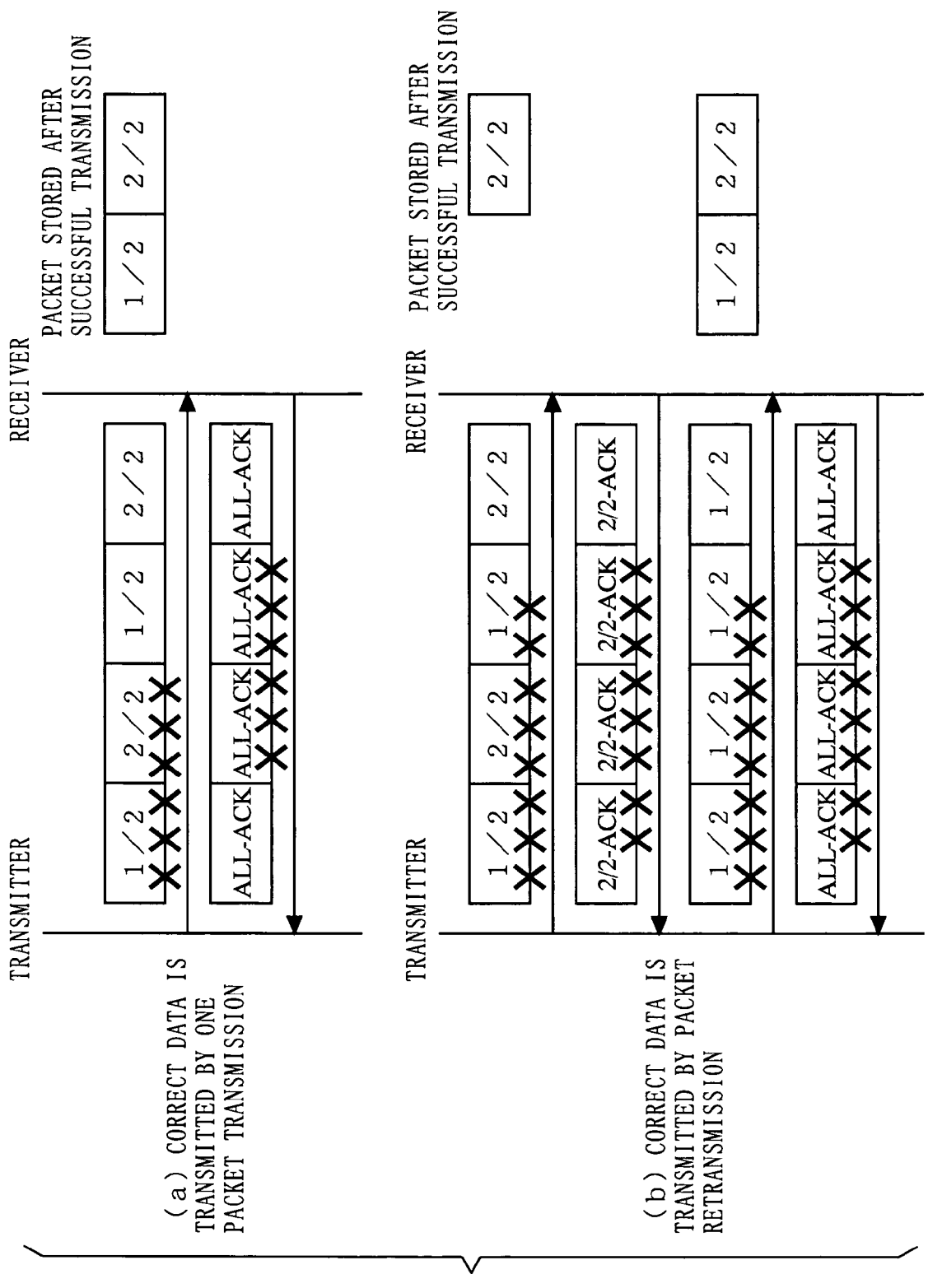

FIG. 14 PRIOR ART (a)

|  | 1 b | 2 b | 3 b | ... | 24 b |
|---|---|---|---|---|---|
| FIRST BLOCK | 1-1 | 2-1 | 3-1 | ... | 24-1 |
| SECOND BLOCK | 1-2 | 2-2 | 3-2 | ... | 24-2 |
| THIRD BLOCK | 1-3 | 2-3 | 3-3 | ... | 24-3 |
| FOURTH BLOCK | 1-4 | 2-4 | 3-4 | ... | 24-4 |

(b)

|  | 1 b | 2 b | 3 b | ... | 24 b |
|---|---|---|---|---|---|
| FIRST BLOCK | 1-1 ✗ | 2-1 | 3-1 | ... | 24-1 |
| SECOND BLOCK | 1-2 ✗ | 2-2 | 3-2 | ... | 24-2 |
| THIRD BLOCK | 1-3 ✗ | 2-3 | 3-3 | ... | 24-3 |
| FOURTH BLOCK | 1-4 | 2-4 | 3-4 | ... | 24-4 |

(c)

|  | 1 b | 2 b | 3 b | ... | 24 b |
|---|---|---|---|---|---|
| FIRST BLOCK | 1-1 ✗ | 2-1 ✗ | 3-1 ✗ | ... | 24-1 |
| SECOND BLOCK | 1-2 ✗ | 2-2 ✗ | 3-2 ✗ | ... | 24-2 |
| THIRD BLOCK | 1-3 ✗ | 2-3 ✗ | 3-3 ✗ | ... | 24-3 |
| FOURTH BLOCK | 1-4 ✗ | 2-4 ✗ | 3-4 ✗ | ... | 24-4 |

COMMUNICATION DEVICE AND COMMUNICATION METHOD IMMUNE TO BURST ERROR, PROGRAM FOR EXECUTING THE METHOD, AND COMPUTER-READABLE STORAGE MEDIUM STORING THE PROGRAM

BACKGROUND OF THE INVENTION

1. Field of the Invention

The present invention relates to a communication device and a communication method immune to burst errors. More particularly, the present invention relates to a communication device (a transmitter, a receiver, and a transmitting/receiving device) which is immune to burst errors caused by fading or noise, a communication method performed by the communication device, a program for executing the communication method, and a computer-readable storage medium for storing the program.

2. Description of the Background Art

With recent improvements in LSI, an error correcting technology has been generally used in communications. As the error correcting technology, Golay codes, which are block correcting codes, are well known. For example, if the Golay (24, 12) code is used, 12 bit data is transmitted with 12-bit redundancy codes added thereto, whereby it is possible to correct errors up to three bits in total 24 bits (=one block). That is, in a case where errors occur in a random order, it is possible to correct errors even if a bit error rate is 0.125 (=3/24). However, in a case where errors intensively occur in a certain period of time, in other words, in a case where so-called burst errors occur, error correction may be impossible. Now, in general, a plurality of blocks (N blocks) for which the above error correction is performed are transmitted for transmitting a lot of data (12×N bits). When a burst error occurs, errors occur intensively in a specific block of N blocks.

For example, a case where an error of four bits occurs in four blocks for which error correction of the Golay (24, 12) code is performed (a bit error rate=approximately 0.042) will be considered. In this case, if the above error occurs randomly in at least two of the four blocks, it is possible to correct errors because the number of error bits in one block does not exceed a correcting capability. However, if the burst error occurs intensively in any one block, it is impossible to perform error correction.

Thus, in order to improve a correcting capability with respect to the burst errors, a transmission technique using an interleaving method has been proposed. Hereinafter, the conventional transmission technique using the interleaving method will be described with reference to FIG. 14.

Part (a) of FIG. 14 is an illustration showing an exemplary method for transmitting four blocks, for which error correction of the Golay (24, 12) code is performed, after interleaving processing. In part (a) of FIG. 14, first to fourth blocks respectively contain 24 bits (12 bit data and 12 bit redundancy codes). In the conventional method, as indicated by dotted arrows in the drawing, a transmitting device sequentially transmits a first bit (1b) of the respective first to fourth blocks, and sequentially transmits a second bit (2b) of the respective first to fourth blocks. Similarly, the transmitting device sequentially transmits a third (3b) to 24th bit (24b) of the respective first to fourth blocks.

On the other hand, a receiving device cyclically distributes the received bits among the four blocks in the same manner as the transmitting device, and reconstructs the first to fourth blocks, respectively. Then, the receiving device performs an error correcting process for the respective reconstructed blocks.

In the above conventional transmission method, bits of the respective blocks are interleaved and transmitted, thereby handling a burst error occurring in intensive and sequential manners. For example, even in the above described case where a burst error of four bits occurs in intensive and sequential manners, only one bit error occurs on a block-by-block basis in the conventional transmission method, whereby error correction can be performed for all the blocks (part (b) of FIG. 14).

However, in a case where the error rate is further deteriorated and a burst length (duration time) of the burst error is increased, a correcting capability of the conventional method quickly reaches its limit. For example, in a case where a burst error of 13 bits occurs intensively in four blocks (a bit error rate=approximately 0.135), at least four bit errors occur in any one block. As a result, it is impossible to perform error correction for the block where four bit errors occurred (part (c) of FIG. 14). That is, even the conventional method using interleaving processing has a problem that error correction cannot be performed for all the blocks if a burst error whose error rate exceeds a random error correcting capability occurs in any block.

In order to address the above problem, in power line carrier communications, for example, an error correcting technique has been proposed (Japanese Patent Laid-Open Publication No. H11-266190) utilizing a fact that a burst error, which is noise, occurs cyclically in synchronization with commercial power (see FIG. 15). A device disclosed in the above gazette includes, as shown in FIG. 16, a transmitter 102 having a power synchronous signal generator 106 for generating a power synchronous signal 105 from commercial power passing through a lamp line 104, a timing signal generating section 110 for generating a timing signal, which is obtained by dividing the power synchronous signal 105 into a plurality of signals, and a control section 111 for transmitting, based on the timing signal, the same information frame (packet) to the lamp line 104 a plurality of different times in order to prevent noise synchronized with the commercial power passing through the lamp line 104 from falling on the same location of the packet. Also, the device disclosed in the above gazette includes a receiver 103 having a storing section 112 for storing a plurality of information frames (packet) received via the lamp line 104, a determining section 113 for determining that an information frame (packet) is a correct signal from among the plurality of information frames, which are the same information frame transmitted the plurality of times, if the information frame includes the least bit error, and a control section 111 for controlling the storing section 112 and the determining section 113.

However, the device disclosed in the above gazette has the following problems.

First, the above device has to include the power synchronous signal generator 106 and the timing signal generating section 110 in order to detect a zero cross of power. Thus, the above two components make it difficult to reduce the size and cost of the device. Also, the above method of determining a cycle of a burst error by detecting a zero cross of the power is applied only to the power line carrier communications.

Second, there arises a problem by transmitting a plurality of frames (packets). In order to perform distributed control for a plurality of terminals, it is necessary to equally enable the respective terminals to perform transmission. Thus, it is preferable to lengthen a transmission time, to some extent, of each transmission, and cause a terminal to pause for some time after transmission. The Japanese Radio Law requires one transmission time and a pause time to be 200 ms, at the maximum, and 40 ms, respectively. Here, a half-cycle of 50 Hz takes 10 ms. Thus, in order to comply with the Japanese Radio Law, a pause time (40 ms) which is quadruple of the half cycle is required for each frame (packet) transmission. Also, in order to perform communications successfully even if a duration time of a burst error (noise) is increased, it is not sufficient to transmit a plurality of frames (packets) three times as exemplified in the above document. As a result, overhead caused by the increased pause time becomes so great that transmission efficiency is reduced and delay times are increased. Especially, in a case where a method of transmitting a plurality of frames (packets) is applied to device control, the increased delay times results in slow response. Thus, a system based on the method of transmitting a plurality of frames (packets) has no practical use.

SUMMARY OF THE INVENTION

Therefore, an object of the present invention is to provide a communication device and a communication method which are capable of correcting a burst error exceeding a correcting capability of an error correcting code by only transmitting one packet, without the need for a special component for detecting a cycle of the burst error.

The present invention has the following features to attain the object mentioned above.

The present invention is directed to a transmitter for transmitting data to a receiver, a receiver for receiving the data from the transmitter, and a communication device including the transmitter and the receiver. In order to attain the object mentioned above, the transmitter of the present invention includes a frame generating section, a frame dividing section, and a transmission control section. Also, the receiver includes a reception control section, a frame reconstructing section, and a frame processing section. The communication device includes all the above components.

In the transmitter, the frame generating section generates at least one predetermined frame by performing at least an error detecting code generating process for data to be transmitted. The frame dividing section divides the at least one frame generated by the frame generating section into a plurality of divided frames, based on a cycle of a burst error whose cyclical occurrence in a course of transmission is predictable. The transmission control section generates a packet in which each of the plurality of divided frames obtained by the frame dividing section is copied at least once in one cycle of the burst error for transmission, and transmits the packet to the receiver.

As a preferable transmitter, the frame generating section performs at least the error detecting code generating process for the data to be transmitted, and generates one frame of L length. The frame dividing section divides the frame of L length generated by the frame generating section, by a length T/n which is obtained by dividing the predicted burst error cycle T by n (n is an integer equal to or greater than two), into $n \times L/T$ divided frames. The transmission control section generates a packet in which each of the $n \times L/T$ divided frames obtained by the frame dividing section is sequentially transmitted n times in one cycle of the burst error.

As another preferable transmitter, the frame generating section divides the data to be transmitted into m (m is a natural number) pieces of data, and generates m frames of L length by performing at least the error detecting code generating process for each of the m pieces of data to which division information indicating division order is further added. The frame dividing section divides each of the m frames of L length generated by the frame generating section by a length T/n, which is obtained by dividing the predicted burst error cycle T by n, into $n \times L/T$ divided frames. The transmission control section generates a packet in which each of the $m \times n \times L/T$ divided frames obtained by the frame dividing section is discontinuously transmitted n/m times in one cycle of the burst error.

In another preferable transmitter, a frame storing section storing the m frames, which are generated by the frame generating section and divided by the frame dividing section, by copying each of the m frames n/m times in order from a first frame to an mth frame, and storing a matrix of divided frames with n rows and $n \times L/T$ columns may be further included. Thus, the transmission control section can sequentially obtain the divided frame from the matrix of divided frames, which is stored in the frame storing section, by performing column-wise interlacing from a first row and first column to a n row and $n \times L/T$ column, and generate a packet including the divided frames in an order in which the divided frames are obtained.

Also, in order to perform reliable data transmission, when a request to retransmit a specific frame is received from the receiver, the transmission control section may generate a packet in which the divided frames contained in the specific frame are sequentially transmitted n times in one cycle of the burst error.

In the receiver, a reception control section receives a packet in which a same divided frame is copied at least once for transmission, in one cycle of a burst error whose cyclical occurrence in a course of transmission is predictable, and sequentially distributes a plurality of divided frames contained in the packet, from a first divided frame, in a cyclical manner into a plurality of groups corresponding to the number of copies of the same divided frame. A frame reconstructing section reconstructs a plurality of frames by assembling the distributed divided frames with respect to each of the plurality of groups of the reception control section. A frame processing section performs at least an error detecting process for each of the plurality of frames reconstructed by the frame reconstructing section, and processes data stored in a frame having no error as reception data.

As a preferable receiver, the reception control section receives a packet in which a same divided frame is sequentially transmitted n times in one cycle of the burst error, and cyclically distributes a plurality of divided frames contained in the packet, from a first divided frame, into first to nth groups. The frame reconstructing section reconstructs n frames by assembling the distributed divided frames with respect to each of the first to nth groups. The frame processing section performs at least the error detecting process for each of n frames reconstructed by the frame reconstructing section, and processes data stored in a frame having no error as reception data.

As another preferable receiver, the reception control section receives a packet in which m types of divided frames are discontinuously transmitted n/m times in one cycle of the burst error, and sequentially distributes a plurality of divided frames contained in the packet, from a first divided frame, into first to nth groups in a cyclical manner. The frame reconstructing section reconstructs n frames by assembling the distributed divided frames with respect to each of the first to nth groups. The frame processing section performs at least the error detecting process for each of the n frames reconstructed by the frame reconstructing section, and processes data stored in a frame having no error as reception data.

In order to perform reliable data transmission, a data processing section for determining whether or not the reception data processed by the data processing section includes all data transmitted by the transmitter, and requiring the transmitter to retransmit a frame having lost data, if any, may be further included.

Note that the frame generating section of the transmitter may generate at least one predetermined frame by performing the error detecting code generating process and an error correcting code generating process for data to be transmitted, and the frame processing section of the receiver may perform the error detecting process and an error correcting process for each of a plurality of frames reconstructed by the frame reconstructing section, and process data stored in a frame having no error as reception data.

The respective processes performed by the frame generating section, the frame dividing section, and the transmission control section of the above transmitter, and the reception control section, the frame reconstructing section, and the frame generating section of the above receiver can be considered as a transmission method providing a series of processes. That is, the above respective processes can be considered as a transmission method performing following processes. On a transmitting side, at least one predetermined frame is generated by performing at least an error detecting code generating process for data to be transmitted, the at least one generated frame is divided into a plurality of frames, based on a cycle of a burst error whose cyclical occurrence in a course of transmission is predictable, a packet in which each of the plurality of divided frames obtained by division is copied at least once in one cycle of the burst error for transmission is generated, and the packet is transmitted to a receiving side. On the receiving side, the packet transmitted from the transmitting side is received, a plurality of divided frames contained in the packet are cyclically distributed from a first divided frame into a plurality of groups corresponding to a number of copies of each of the plurality of divided frames, a plurality of frames are reconstructed by assembling the distributed divided frames with respect to each of the plurality of groups, at least an error detecting process is performed for each of the plurality of reconstructed frames, and data stored in a frame having no error is processed as reception data.

Preferably, the above communication method is provided as a program for causing a communication device (or a computer such as a microcomputer and a personal computer) to perform a series of processes. The program may be stored in a computer-readable storage medium.

According to the present invention, n copies of the divided frame are transmitted in one burst error cycle on the transmission side, whereby the receiving side can reliably receive, in each cycle, the divided frame unaffected by the burst error. Thus, it is possible to realize a transmitting device immune to burst errors, which is capable of correcting a burst error exceeding a correcting capability of an error correcting code by only transmitting one packet, without the need for a special component for detecting a cycle of the burst error, for example, a power synchronous signal generator or a timing signal generating section.

Also, on the transmitting side, the same divided frame of the first half of transmission data and the same divided frame of the last half of the transmission data are alternately repeated once for transmission in one burst cycle, whereby the receiving side can reliably receive, in each cycle, the divided frame unaffected by the burst error by one or two transmissions. Thus, it is possible to improve transmission capability in the case where a length of a burst error is short. Also, in the case where a length of a burst error is long, it is possible to correct a burst error exceeding a correcting capability of an error correcting code by performing a retransmission process.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing the structure of a communication device according to a first embodiment of the present invention;

FIG. 5 is an illustration for describing the structures of a frame and a packet processed by the receiver 3;

FIGS. 6A and 6B are illustrations for describing effects of a communication method according to the first embodiment when a burst error occurs;

FIG. 10 is an illustration for describing the structures of a frame and a packet processed by the transmitter 6;

FIG. 11 is an illustration for describing the structures of a frame and a packet processed by the receiver 7;

FIGS. 12A to 12C are illustrations for describing effects of a communication method according to the second embodiment when a burst error occurs;

FIG. 13 is a sequence diagram corresponding to communications shown in FIGS. 12A to 12C;

FIG. 14 is an illustration for describing a conventional transmission technique using an interleaving method;

DESCRIPTION OF THE PREFERRED EMBODIMENTS

Figure 2:
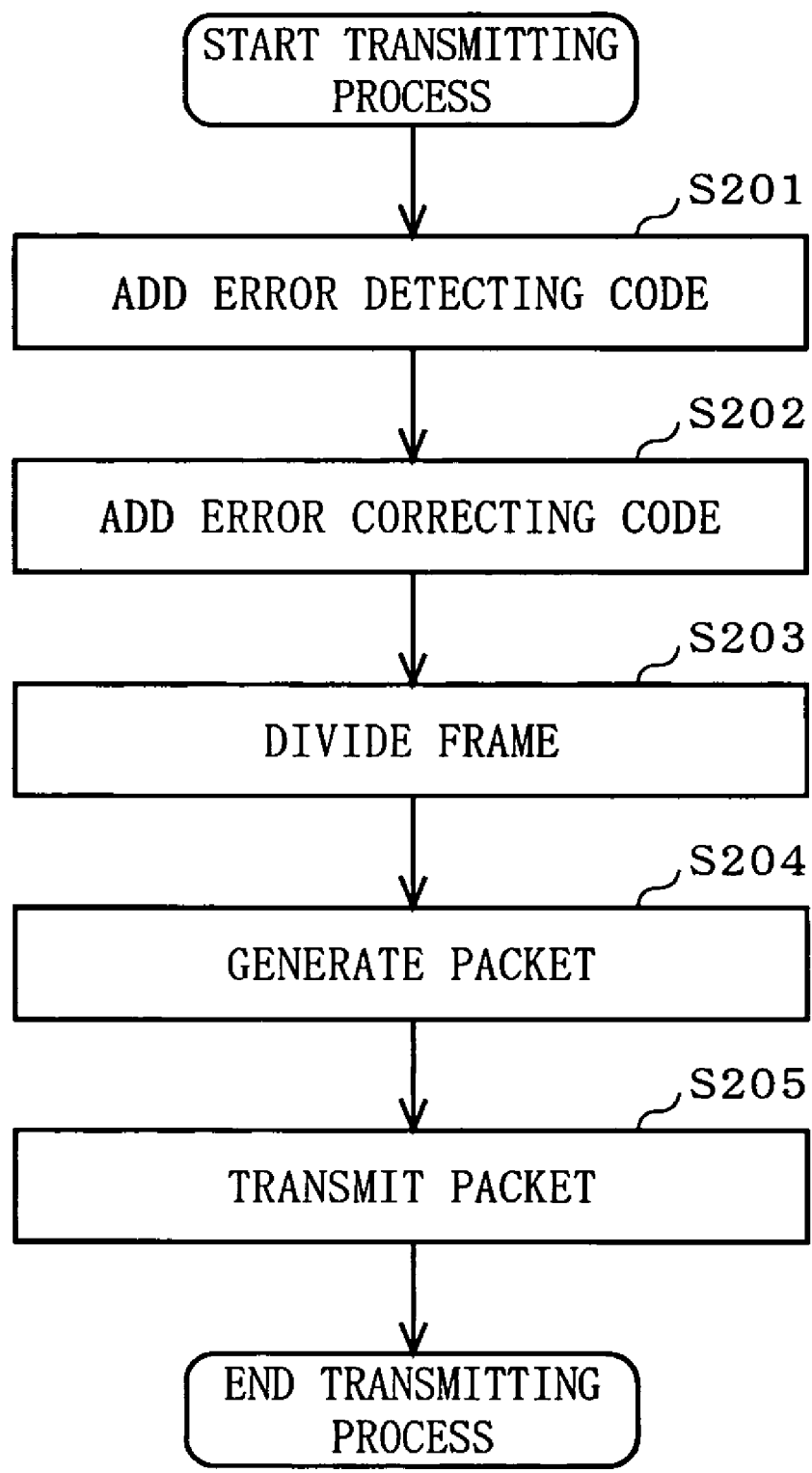
FIG. 2 is a flowchart showing a transmitting process performed by a transmitter 2.

Hereinafter, embodiments of the present invention will be described with reference to the drawings. Note that a transmission medium used in communications of the present invention is not limited, and either radio or cable communications can be applied to the present invention. Also, in the present invention, a burst error, which occurs due to fading caused by high-speed moving, etc., and whose burst cycle is determined in proportion to moving speeds, will be described as a burst error in radio communications whose frequency is higher than a high-frequency band. Also, a burst error which occurs due to noise, which is caused by an electric device, in synchronization with a frequency of commercial power will be described as a burst error in other cable communications.

(First Embodiment)

FIG. 1 is a block diagram showing the structure of a communication device according to a first embodiment of the present embodiment. In FIG. 1, a communication device 1 according to the first embodiment includes a transmitter 2 and a receiver 3. In the first embodiment, the communication device 1 in which the transmitter 2 is united with the receiver 3 will be described. However, the transmitter 2 and the receiver 3 may be separately provided. The transmitter 2 includes a control section 21, a frame generating section 22, a frame dividing section 23, a transmission control section 24, and a transmitting section 25. The receiver 3 includes a control section 31, a frame processing section 32, a frame reconstructing section 33, a reception control section 34, and a receiving section 35. The control section 21 and the control section 31 may be united. Also, the transmitting section 25 and the receiving section 35 may be united as a transmitting/receiving section.

First, the above respective components will be outlined.

In the transmitter 2, the control section 21 performs data transmission and a setting process of various parameters. The frame generating section 22 generates a frame, for which a predetermined error detecting coding process and a predetermined error correcting coding process are performed, with respect to data to be transmitted. The frame dividing section 23 divides the frame generated by the frame generating section 22 by a predetermined number so as to obtain a plurality of frames. The transmission control section 24 generates a packet in which each of the plurality of divided frames divided by the frame dividing section 23 is repeated a predetermined times. The transmitting section 25 sends the packet generated by the transmission control section 24 to a transmission medium 4. The transmitting section 25 includes a modulator for modulating the packet and transmitting the modulated packet, and an I/F circuit (an antenna, a coupling transformer, an amplifier, and a high frequency circuit, etc.) for radio or cable communications.

In the receiver 3, the control section 31 performs data reception and a setting process of various parameters. The receiving section 35 receives a packet transmitted from the transmitter via the transmission medium 4. The receiving section 35 includes a demodulator for demodulating the received packet, and an I/F circuit for radio or cable communications. The reception control section 34 divides the packet received by the receiving section 35 into a predetermined number of frame groups. The frame reconstructing section 33 reconstructs the frame by assembling the divided frames divided by the reception control section 34 in a predetermined order. The frame processing section 32 performs a predetermined error correcting process and a predetermined error detecting process for the frame reconstructed by the frame reconstructing section 33.

Note that a method of the modulator and the demodulator included in the transmitting section 25 and the receiving section 35, respectively, is not specifically limited, and OFDM method, CDMA method, SS method, FSK method, PSK method, ASK method, and other various methods may be used. Also, each of the above components may be structured as a software algorithm of a computer or a microcomputer, hardware, or a combination thereof.

Figure 3:
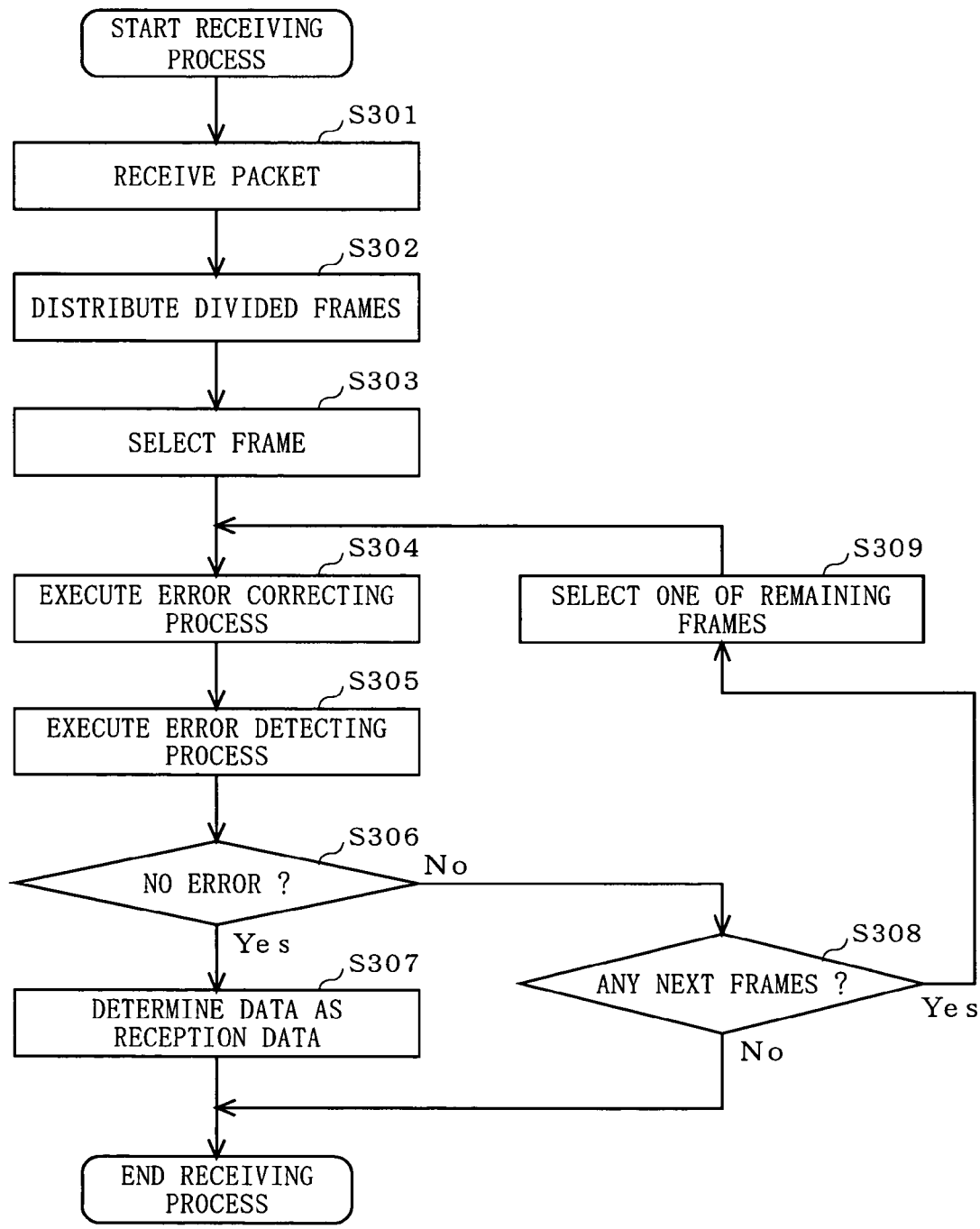
FIG. 3 is a flowchart showing a receiving process performed by a receiver 3.
Figure 4:
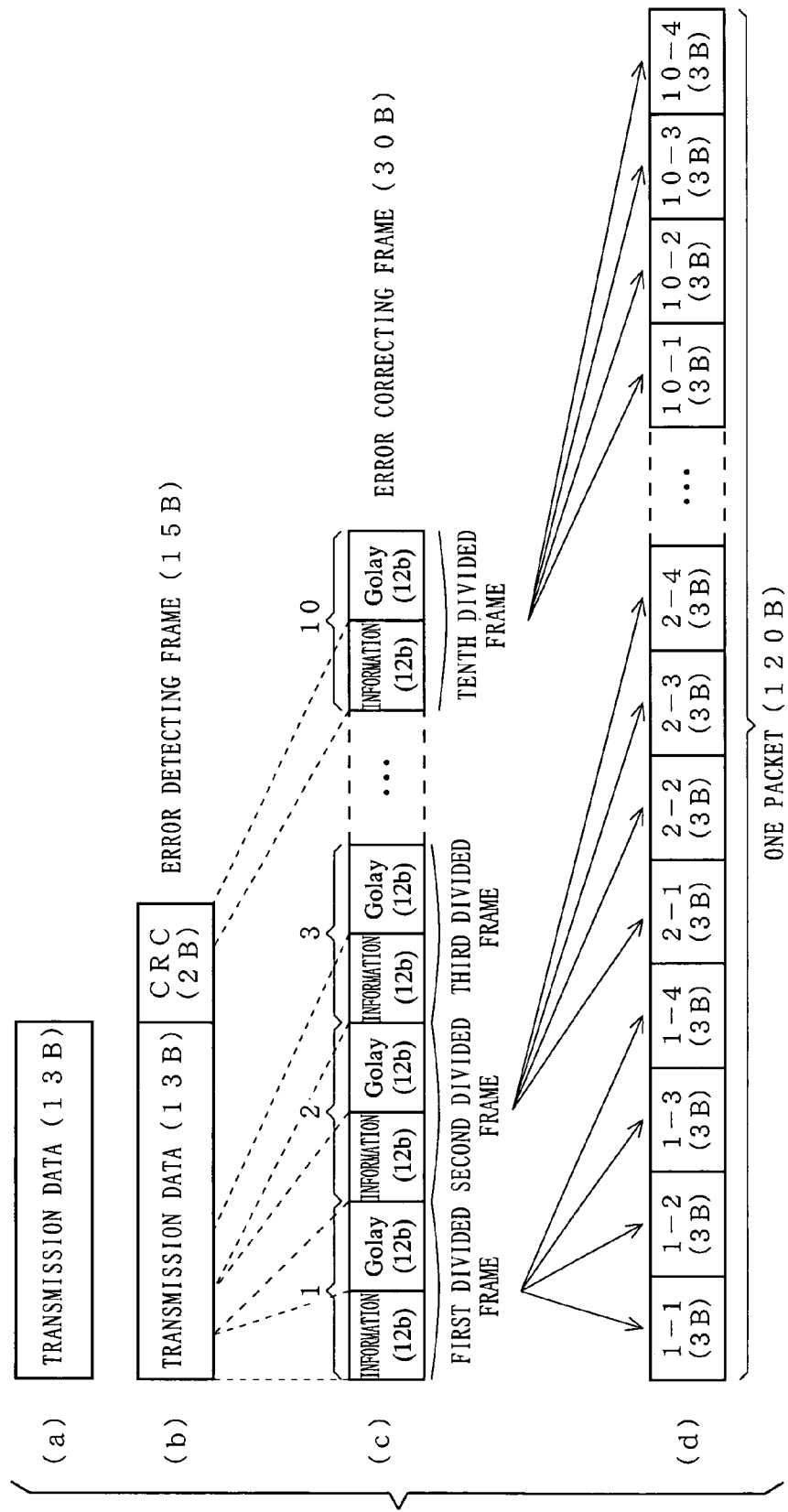
FIG. 4 is an illustration for describing the structures of a frame and a packet processed by the transmitter 2.

Next, a communication method performed by the communication device according to the first embodiment will be described. FIG. 2 is a flowchart showing a transmitting process performed by the transmitter 2. FIG. 3 is a flowchart showing a receiving process performed by the receiver 3. FIG. 4 is an illustration for describing the structures of the frame and the packet processed by the transmitter 2. FIG. 5 is an illustration for describing the structures of the frame and the packet processed by the receiver 3. FIGS. 6A and 6B are illustrations for describing effects of a communication method according to the first embodiment when a burst error occurs.

Now, an exemplary case in which data of 13 bytes (part (a) of FIG. 4) is transmitted from the transmitter 2 will be described. Note that, in the drawings, byte is represented as "B", and bit is represented as "b". In this case, the control section 21 transfers the transmission date of 13 bytes to the frame generating section 22. Note that, in a case where processing is performed by software of a microcomputer, the control section 21 may notify the frame generating section 22 of an address indicating a field in which the transmission data is stored. The frame generating section 22 calculates an error detecting code with respect to the transmission data received from the control section 21, and adds the calculated error detecting code to the transmission data (step S201). In this example, a CRC of two bytes is added to the transmission data, and an error detecting frame of 15 bytes is generated (part (b) of FIG. 4). Note that, in a case where data communications are performed between a plurality of devices, a transmission source ID and a transmission destination ID are generally added to data, but those IDs are not directly related to the present invention and therefore are not further described herein. Also, in order to use data of variable-length, a code indicating a data length is added to data, but the description thereof is omitted herein.

The frame generating section 22 further calculates an error correcting code with respect to the error detecting frame, and adds the calculated error correcting code to the error detecting frame (step S202). In this example, a case in which the Golay (24, 12) code, which has been described in the BACKGROUND OF THE INVENTION section, is used as an error correcting code. In a case where the Golay (24, 12) code is used, an error correcting code of 12 bits is sequentially calculated and added for every 12 bits from a head of the error detecting frame of 15 bytes (120 bits) for which error correction is to be performed. Thus, as shown in part (c) of FIG. 4, the error correcting frame generated by adding the error correcting code includes ten error correcting blocks, and a frame length L thereof is 30 bytes.

Here, a cycle of a burst error occuring over the transmission medium 4 (in the course of transmission) is predicted. An exemplary case in which the communication device of the present invention is applied to power line carrier communications and the burst error occurs due to noise synchronized with 50 Hz commercial power will be described herein. In this case, a cycle T of the burst error is 10 ms (=1s/50 Hz/2), which is a half-wavelength cycle of the commercial power. Also, the above 10 ms is 12 bytes (=0.01×9600=96 bits) if it is converted into the number of bytes in consideration of communication speed of 9600 bits/second, which is practically used in the power line carrier communications. As a result, in the above case, it is predicted that the burst error occurs for every data of 12 bytes.

As such, a rough prediction of a cycle of a burst error enables the receiver to distinguish data in which no burst error occurs from data in which a burst error almost always occurs if the transmitter transmits data by synchronizing the data with the above cycle. Thus, the frame dividing section 23 divides the error correcting frame generated by the frame generating section 22 into a plurality of frames so that each divided frame has a predetermined size s determined based on the predicted cycle of the burst error (step S203). Then, the transmission control section 24 generates a packet in which each of the plurality of divided frames divided by the frame dividing section 23 is copied a predetermined times n, which is determined based on the predicted cycle of the burst error (step S204). The predetermined sizes and the predetermined number n are, for example, determined as follows. The predetermined number n is a parameter for determining how many times the same one divided frame is repeatedly transmitted. The greater the number n is increased, the more immune the packet becomes to a burst error with a longer burst length, but the effective communication speed is reduced inversely proportional to the increased number n. Thus, it is necessary to select a predetermined number n most suitable for a communication system. In this example, it is assumed that n is four if the cycle T of the burst error is 12 bytes, whereby it is determined that the predetermined size s is 3 (=T/n) bytes. In this case, as shown in part (c) of FIG. 4, an error correcting frame of 30 bytes is divided into ten (=n×L/T) divided frames, that is, a first divided frame to a tenth divided frame, by the predetermined size s=3 bytes (24 bits), which is a unit of division. Then, as shown in part (d) of FIG. 4, each of the divided first to tenth divided frames is sequentially copied the predetermined times n=4, and a packet of 120 (=L×n) bytes is generated.

For the above parameters T, n, and L, it is assumed that values predetermined based on the predicted burst error cycle are set in the control section 21, and the control section 21 gives these parameters to any components, if necessary. Note that, in a case where a cycle of the burst error fluctuates in the radio communications, etc., the parameters T, n, and L may be dynamically changed by detecting a fading cycle, or may be adjusted by performing feedback control for the error detecting results obtained by the receiver.

The transmission control section 24 transmits the packet generated as described above via the transmitting section 25 (step S205). The transmitting section 25, after adding a preamble necessary for bit synchronization and a synchronous code necessary for frame synchronization to the packet to be transmitted by the transmission control section 24, modulates the packet by the modulator, and sends the modulated packet to the transmission medium 4 via the I/F circuit.

Next, an operation when the packet having the above frame structure is received will be described. The receiving section 35 receives and demodulates the packet (part (a) of FIG. 5) maintaining bit synchronization and frame synchronization (step S301). The reception control section 34 distributes the divided frames contained in the packet demodulated by the receiving section 35 in accordance with the predetermined number n, based on which each divided frame is copied in the transmitter (step S302). In this example, in accordance with the parameters T, n, and L, which are previously set in the control section 31, the divided frames are distributed by 3 bytes into four groups (part (b) of FIG. 5). The frame reconstructing section 33 reconstructs the divided frames, which are distributed by the reception control section 34, on a group-by-group basis, and obtains four reconstructed error correcting frames of 30 bytes (=frame length L) (part (c) of FIG. 5). Note that, in a case where processing is performed by software of the microcomputer, a relationship among fields in which data is stored may be changed.

The frame processing section 32 performs an error correcting process and an error detecting process for any one of the four error correcting frames reconstructed by the frame reconstructing section 33, and extracts the transmission data (part (d) of FIG. 5) (steps S303 to S305). Then, the frame processing section 32 determines whether or not the extracted transmission data includes any errors (step S306). If the extracted data has no error, the frame processing section 32 transfers the transmission data to the control section 31 as reception data (step S307). Note that, in a case where processing is performed by software of the microcomputer, an address indicating a field in which the data is stored may be notified. On the other hand, if the extracted data includes any errors, the frame processing section 32 similarly performs the error correcting process and the error detecting process with respect to any of the remaining error correcting frames, and extracts the transmission data (steps S309, S304 to S305). In a case where transmission data having no error cannot be extracted after the four error correcting frames are processed, the frame processing section 32 ends the reception process as unsuccessful data reception (No at step S308).

Finally, FIGS. 6A and 6B are used for describing that the communication method of the first embodiment substantially improves a burst error correcting capability. FIGS. 6A and 6B show a case where a burst error (shown in FIGS. 6A(b) and 6B(b)) whose cycle T and length are 12 bytes and 9 bytes, respectively, occurs when a packet (shown in FIGS. 6A(a) and 6B(a)) in which a divided frame of three bytes is copied four times is transmitted. A phase of the packet has no correlation to a phase of the burst error. Note that, on a bit basis, there are 96 patterns of phase relations between the packet and the burst error, and therefore descriptions of these phase relations are omitted other than those shown in FIGS. 6A and 6B. In this example, the same one divided frame is quadruplicated in one burst cycle, whereby many errors occur in any three divided frames of the four quadruplicated divided frames. However, no error occurs in one frame of the four quadruplicated divided frames. Furthermore, the frame in which no error occurred is arranged so that its position is always the same in each burst cycle, whereby it is possible to substantially improve an error correcting capability.

That is, in a case shown in FIG. 6A, a frame reconstructed from divided frames belonging to a fourth group as shown in part (c4) of FIG. 6A has no error, thereby performing accurate error correction. Thus, it is possible to determine that this frame is reception data. Also, in a case shown in FIG. 6B, a frame reconstructed from divided frames belonging to a second group as shown in part (c2) of FIG. 6A has no error, thereby performing accurate error correction. Thus, it is possible to determine that this frame is reception data.

As such, in the communication device and the communication method according to the first embodiment of the present invention, it is possible to correct a burst error exceeding a correcting capability of an error correcting code by only transmitting one packet, without the need for a special component for detecting a cycle of the burst error. Also, it is possible to perform processing for a frame stored in a memory, etc., by software, in accordance with transmission speeds or response speeds.

(Second Embodiment)

In the technique described in the above first embodiment, transmission of the same one divided frame is repeated the predetermined times n, in order to correct a burst error exceeding a correcting capability of an error correcting code. As a result, transmission efficiency is always decreased by 1/n compared to a normal transmission, regardless of the presence or absence of a burst error. Thus, in a second embodiment, a communication device and a communication method, by which a burst error can be corrected utilizing a burst error correcting capability as described in the first embodiment, and transmission efficiency exceeding the level of the first embodiment can be realized when there is no burst error, will be described.

Figure 7:
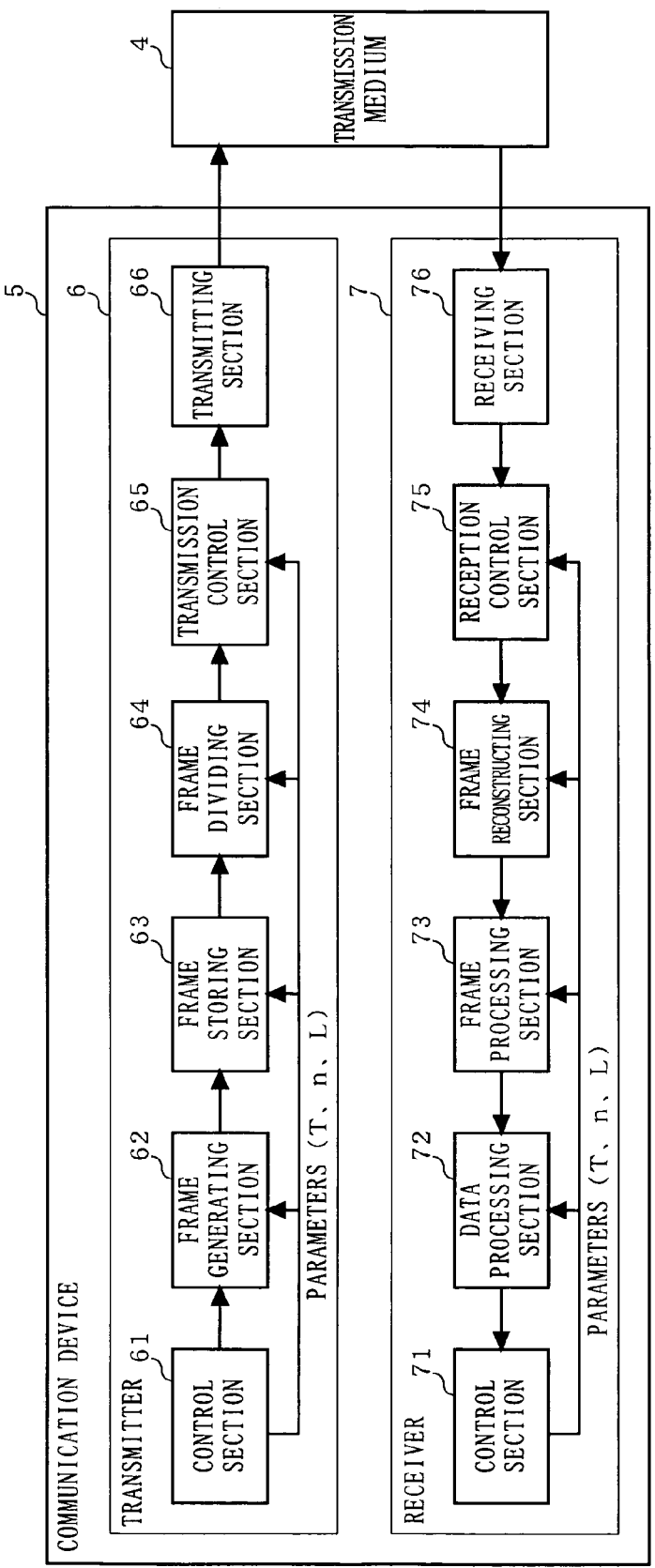
FIG. 7 is a block diagram showing the structure of a communication device according to a second embodiment of the present invention.

FIG. 7 is a block diagram showing the structure of a communication device according to the second embodiment of the present invention. In FIG. 7, a communication device 5 according to the second embodiment includes a transmitter 6 and a receiver 7. In the second embodiment, the communication device 5 in which the transmitter 6 and the receiver 7 are united will be described, but the communication device 5 may separately include the transmitter 6 and the receiver 7. The transmitter 6 includes a control section 61, a frame generating section 62, a frame storing section 63, a frame dividing section 64, a transmission control section 65, and a transmitting section 66. The receiver 7 includes a control section 71, a data processing section 72, a frame processing section 73, a frame reconstructing section 74, a reception control section 75, and a receiving section 76. The control section 61 and the control section 71 maybe united. Also, the transmitting section 66 and the receiving section 76 may be united as a transmitting/receiving section.

First, the above respective components will be outlined. In the transmitter 6, the control section 61 performs data transmission and a setting process of various parameters. The frame generating section 62 divides data to be transmitted into a predetermined number of data, and generates a frame by performing a predetermined error detecting coding process and a predetermined error correcting process for each divided data. The frame storing section 63 stores a plurality of frames generated by the frame generating section 62 in a predetermined order. The frame dividing section 64 divides each of the plurality of frames stored in the frame storing section 63, based on a predetermined unit of division. The transmission control section 65 generates a packet in which the plurality of divided frames divided by the frame dividing section 64 are arranged in accordance with a predetermined interleaving process. The transmitting section 66 sends, to the transmission medium 4, the packet generated by the transmission control section 65. The transmitting section 66 has the same structure as the above transmitting section 25.

In the receiver 7, the control section 71 performs data reception and a setting process of various parameters. The receiving section 76 receives a packet transmitted from the transmitter via the transmission medium 4. The receiving section 76 has the same structure as the above receiving section 35. The reception control section 75 divides the packet received by the receiving section 76, based on the predetermined unit of division. The frame reconstructing section 74 reconstructs the frame by assembling the divided frames divided by the reception control section 75 in accordance with the predetermined interleaving process. The frame processing section 73 performs the predetermined error correcting process and the predetermined error detecting process for the frame reconstructed by the frame reconstructing section 74.

Figure 8:
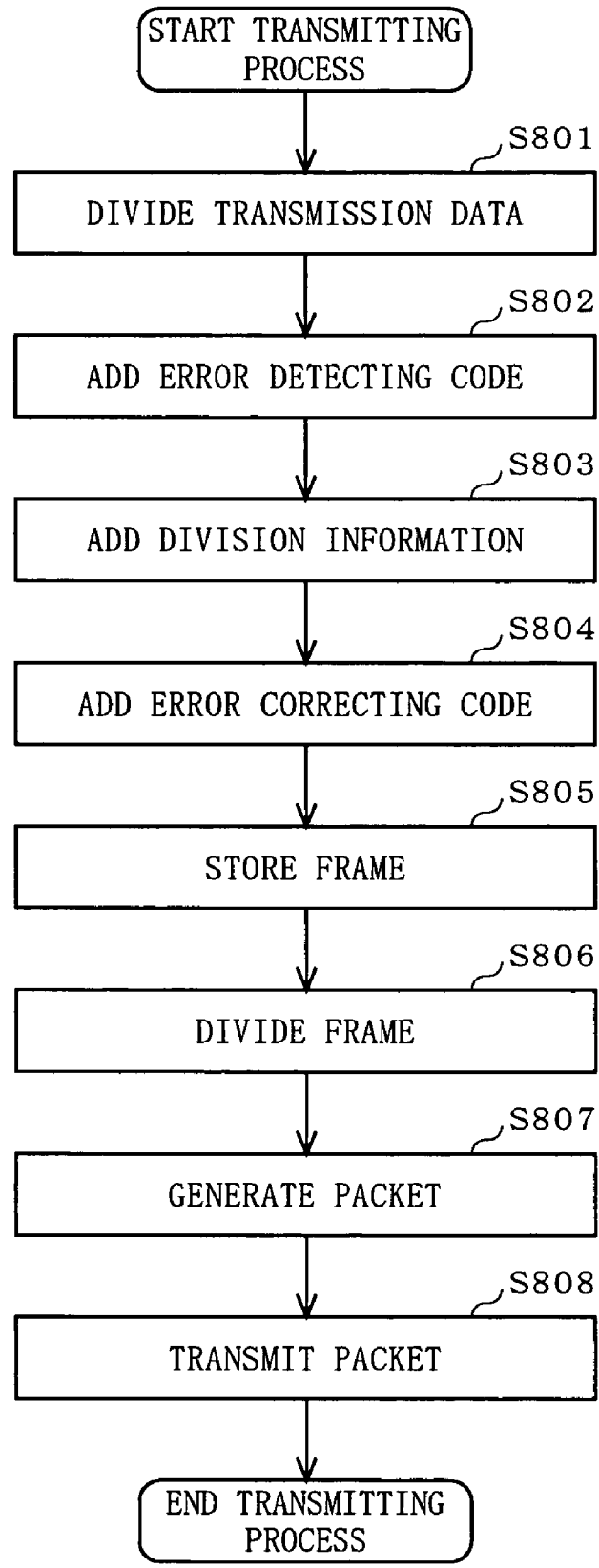
FIG. 8 is a flowchart showing a transmitting process performed by a transmitter 6.
Figure 9:
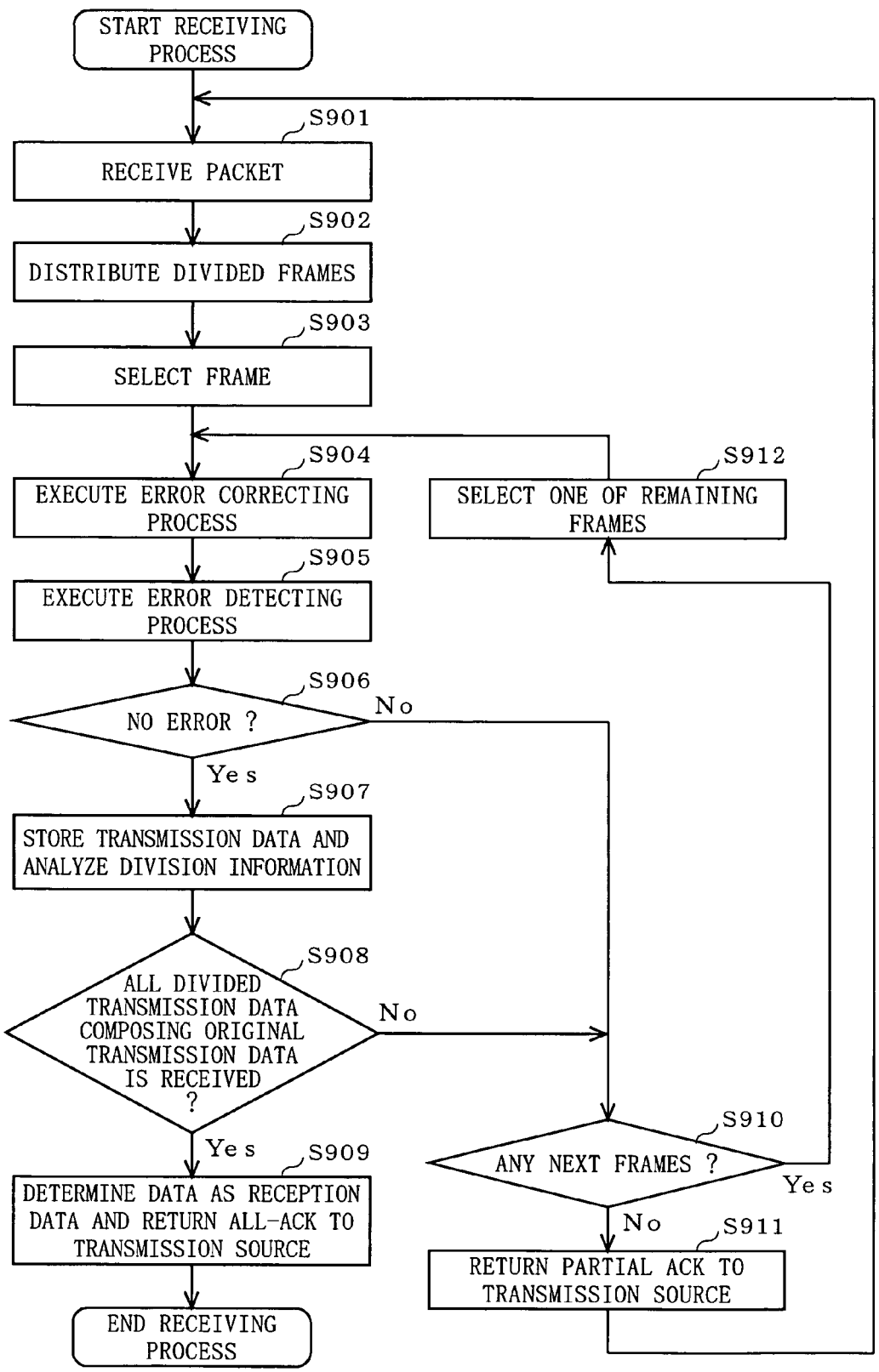
FIG. 9 is a flowchart showing a receiving process performed by a receiver 7.
Figure 15:
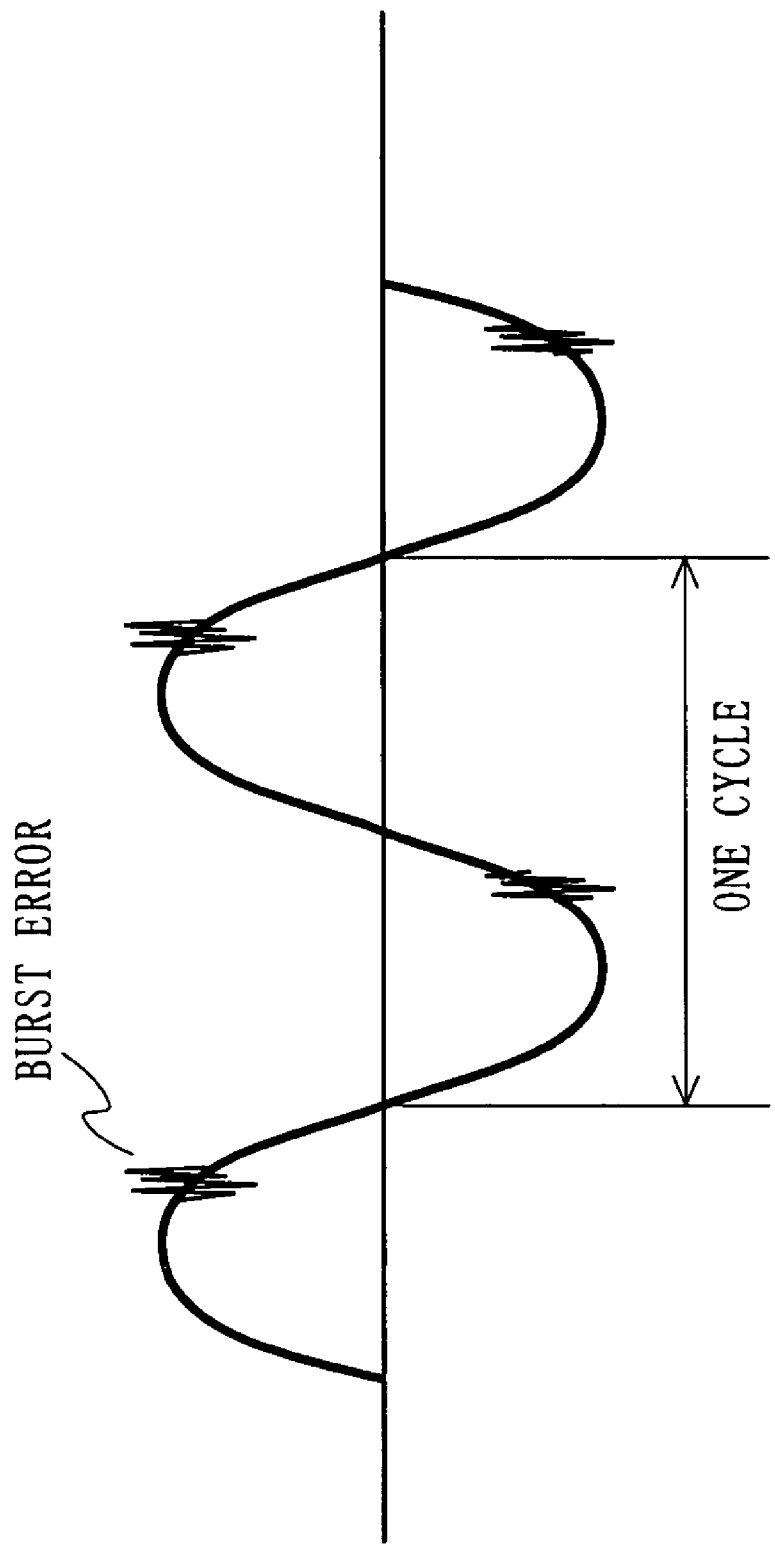
FIG. 15 is an illustration for describing that a burst error cyclically occurs in synchronization with commercial power.
Figure 16:
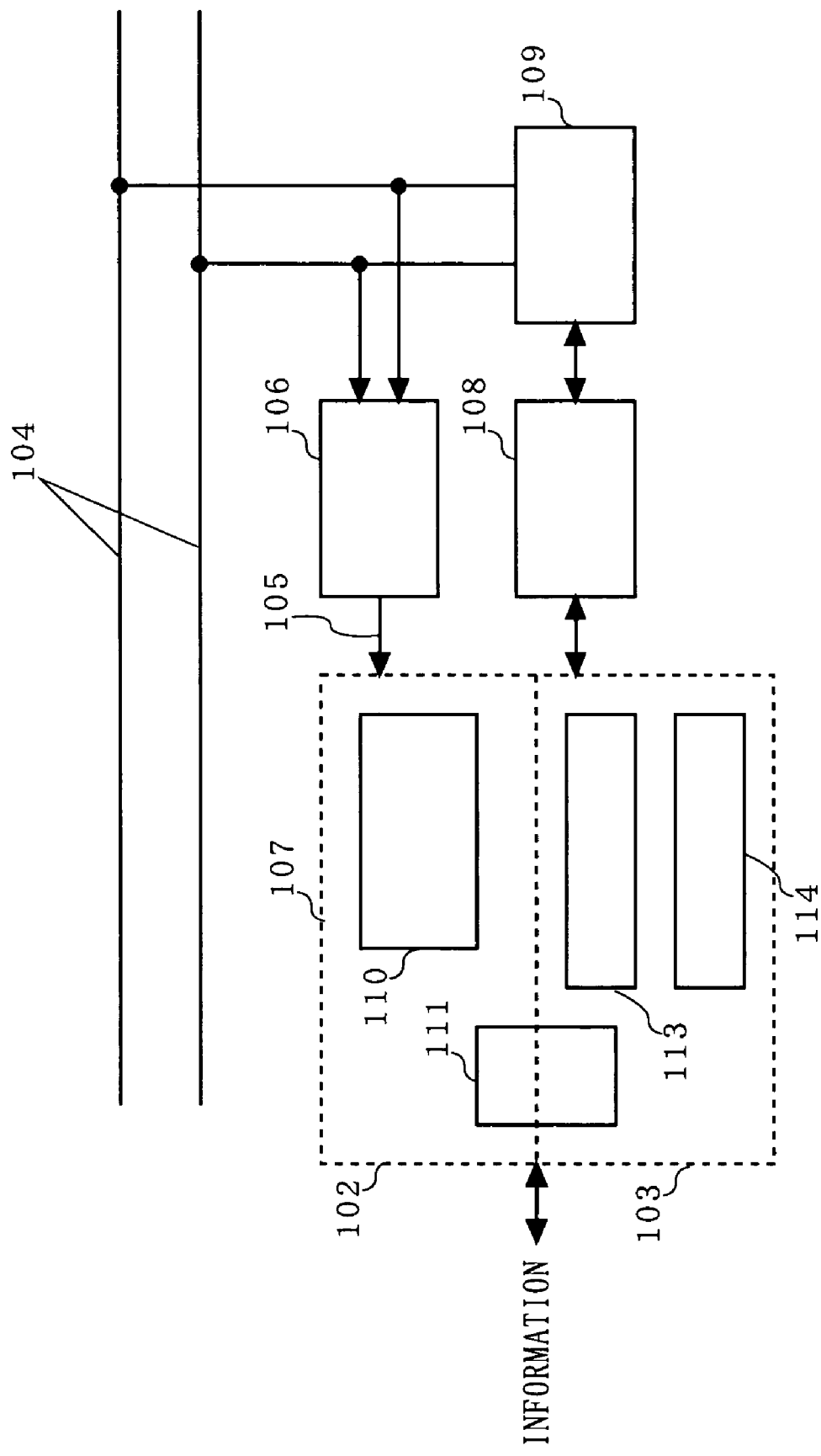
FIG. 16 is a block diagram showing an exemplary structure of a conventional communication device.

Next, the communication method performed by the above communication device according to the second embodiment will be described. FIG. 8 is a flowchart showing a transmitting process performed by the transmitter 6. FIG. 9 is a flowchart showing a receiving process performed by the receiver 7. FIG. 10 is an illustration for describing the structures of the frame and the packet processed by the transmitter 6. FIG. 11 is an illustration for describing the structures of the frame and the packet processed by the receiver 7. FIGS. 12A to 12C are illustrations for describing effects of the communication method according to the second embodiment when a burst error occurs. FIG. 13 is a sequence diagram corresponding to communications shown in FIGS. 12A to 12C.

Now, a case where data of 24 bytes (part (a) of FIG. 10) is transmitted from the transmitter 6 will be described. In this case, the control section 61 transfers the transmission data of 24 bytes to the frame generating section 62. Note that, in a case where processing is performed by software of a microcomputer, the control section 61 may notify the frame generating section 62 of an address indicating a field in which the transmission data is stored. The frame generating section 62 divides the transmission data received from the control section 61 by a predetermined dividing number m (step S801), calculates an error detecting code for each divided transmission data, and adds the calculated error detecting code to each divided transmission data (step S802). Also, the frame generating section 62 adds division information, which indicates how much data is generated by dividing the original transmission data, and where each divided transmission data is in the plurality of divided original transmission data, to each divided transmission data (step S803). In this example, it is assumed that the predetermined dividing number m is 2. Thus, the transmission data of 24 bytes is divided into two pieces of transmission data of 12 bytes, and a CRC of two bytes and division information of one byte are added to the respective two pieces of transmission data, thereby generating two error detecting frames of 15 bytes (part (b) of FIG. 10). FIG. 10 shows a case where a mark "1/2" indicating a first half of the divided transmission data and a mark "2/2" indicating a last half thereof are added to the corresponding divided transmission data as division information. Note that codes indicating a transmission source ID, a transmission destination ID, and a data length are omitted, as is the case with the first embodiment.

Furthermore, the frame generating section 62 calculates an error correcting code with respect to each error detecting frame, and adds the calculated error correcting code to each error detecting frame (step S804). In this example, a case where the Golay (24, 14) code, which has been mentioned in the "BACKGROUND OF THE INVENTION" section, is used as an error correcting code is described. The Golay (24,12) code has been described in the above first embodiment. Thus, as shown in part (c) of FIG. 10, each of the two error correcting frames generated by adding the error correcting code includes ten error correcting blocks, and a frame length thereof is 30 bytes.

Based on the dividing number m and the predetermined number n, the frame storing section 63 arranges the plurality of error correcting frames, which are generated by the frame generating section 62, in order of division of the original transmission data, and stores n/m copies of each of the plurality of error correcting frames (Step S805). For example, as is the case with the first embodiment, a case where a cycle T of a burst error, which occurs over the transmission medium 4 (in the course of transmission), is predicted to be 12 bytes, and a divided frame of three bytes (predetermined size s) is transmitted four (predetermined number n) times during the above cycle of 12 bytes will be described. In this case, the frame storing section 63 stores the two error correcting frames generated by the frame generating section 62 as follows: an error correcting frame of the first half of the transmission data is stored in a first field, an error correcting frame of the last half of the transmission data in a second field, an error correcting frame of the first half of the transmission data in a third field, and an error correcting frame of the first half of the transmission data in a fourth field, respectively (part (d) of FIG. 10). Note that, with regard to a copy of the error correcting frame, a copy may be actually performed in memory space, or a virtual copy may be performed by defining an address transformation in order to minimize a memory consumption.

The frame dividing section 64 divides each error correcting frame stored in the frame storing section 63 into a plurality of divided frames of the predetermined size s, which is determined based on the predicted cycle of the burst error (step S806). In this example, as shown in part (d) of FIG. 10, each error detecting frame of 30 bytes is divided by the predetermined size s=3 bytes (24 bits), which is a dividing unit, into ten (=n×L/T) divided frames, that is, a first to tenth divided frames. Then, the transmission control section 65 generates a packet in which the plurality of divided frames divided by the frame dividing section 64 are arranged in accordance with the predetermined interleaving method and stored (step S807). The predetermined interleaving method is performed as follows: As shown by an arrow in part (d) of FIG. 10, first divided frames of the respective fields are sequentially extracted, and second divided frames of the respective fields are also sequentially extracted. Similarly, the third to tenth divided frames of the respective fields are extracted. As a result, as shown in part (e) of FIG. 10, a packet of 120 (=L×n) bytes, in which one error correcting frame of the first half of the transmission data and one error correcting frame of the last half of the transmission data are alternately repeated (in other words, two error correcting frames are discontinuously repeated m (=dividing number) times), is generated.

For the above parameters T, n, and m, it is assumed that values predetermined based on the predicted burst error cycle are set in the control section 61, and the control section 61 gives these parameters to any components, if necessary. Note that, in a case where a cycle of the burst error fluctuates in the radio communications, etc., the parameters T, n, and m may be dynamically changed by detecting a fading cycle, or may be adjusted by performing feedback control for the error detecting results obtained by the receiver.

The transmission control section 65 transmits the above packet via the transmitting section 66 (step S808). The transmitting section 66, after adding a preamble necessary for bit synchronization and a synchronous code necessary for frame synchronization to the packet to be transmitted by the transmission control section 65, modulates the packet by the modulator, and sends the modulated packet to the transmission medium 4 via the I/F circuit.

Next, an operation when the packet having the above frame structure is received will be described. The receiving section 76 receives and demodulates the packet (part (a) of FIG. 11) maintaining bit synchronization and frame synchronization (step S901). The reception control section 75 distributes the divided frames contained in the packet demodulated by the receiving section 76 in accordance with the interleaving process used in the receiver (step S902). In this example, in accordance with the parameters T, n, and m previously set in the control section 71, the divided frames are distributed by three bytes into four groups (part (b) of FIG. 11). The frame reconstructing section 74 reconstructs the four error correcting frames (frame length L=30 bytes) by assembling the divided frames divided by the reception control section 75 on a group-by-group basis (part (b) of FIG. 11). Note that, in a case where processing is performed by software of the microcomputer, a relationship among fields in which data is stored may be changed.

The frame processing section 73 extracts one piece of transmission data (part (c) of FIG. 11) by performing an error correcting process and an error detecting process for any one of the four error correcting frames reconstructed by the frame reconstructing section 74 (steps S903 to S905). Next, the frame processing section 73 determines whether or not the extracted transmission data includes any errors (step S906). If the determination is made by the frame processing section 73 that the extracted transmission data has no error, the data processing section 72 temporarily stores the transmission data and analyzes the division information (step S907). Then, the data processing section 72 determines whether or not all the divided transmission data composing the original transmission data is received (step S908). If all the divided transmission data composing the original transmission data is received, the data processing section 72 determines that the data is successfully received, and transfers the plurality of transmission data to the control section 71 as reception data (step S909). Note that, in a case where processing is performed by software of a microcomputer, the data processing section 72 may notify the control section 71 of an address indicating a field in which the transmission data is stored. Furthermore, if all the divided transmission data composing the original transmission data is received, the data processing section 72 returns an ALL-ACK frame indicating that all transmission data has been received to the transmitter 6 which is a transmission source (step S909). The ACK frame including a command "ACK" as data contents is transmitted by a method immune to a burst error, as is the case with the first embodiment.

On the other hand, if the determination is made by the frame processing section 73 that the extracted data includes any errors, or the data processing section 72 determines that all the divided transmission data composing the original transmission data is not received, the transmission data is extracted with respect to any remaining error correcting frame by performing the error correcting process and the error detecting process in a similar manner (step S912, and S904 to S905). If all the divided transmission data composing the original transmission data is not received after all the four error correcting frames are processed, the data processing section 72 determines that data reception is unsuccessful, and returns a partial ACK indicating a portion of the transmission data, which has been received, to the transmitter 6 which is a transmission source (steps S910 and S911).

The transmitter 6, which is a transmission source, receives the partial ACK, rewrites the entire field stored in the frame storing section 63 to an error correcting frame which does not include the transmission data indicated by the partial ACK, divides the rewritten error correcting frame into a plurality of divided frames by the frame dividing section 64, and newly generates a packet in which the divided frames are arranged in accordance with the predetermined interleaving process and stored by the transmission control section 65. Then, the transmitter 6 retransmits the generated packet to the receiver 7 (steps S805 to S808 shown in FIG. 8). As a result, it is possible to retransmit the packet in which only the divided frames about the transmission data which has not been received by the receiver are stored, whereby the retransmitted data is immune to the burst error compared to the first data transmission. Then, the receiver 7 processes the retransmitted data in a similar manner as described above (step S901 to S912).

Next, FIGS. 12A to 12C and FIG. 13 are used for describing that a burst error correcting capability is substantially improved by the communication method according to the second embodiment. FIG. 12A shows a case where a burst error (part (b) of FIG. 12A) whose cycle T and length are 12 bytes and 6 bytes, respectively, occurs when a packet (part (a) of FIG. 12A) in which one divided frame (three bytes) of the first half of the transmission data and one divided frame (three bytes) of the last half of the transmission data are alternately repeated. A phase of the packet has no correlation to a phase of the burst error. In this example, the same divided frame of the first half of the transmission data and the same divided frame of the last half of the transmission data are alternately repeated once in one burst cycle. Thus, many errors occur in any consecutive divided frames of the first and last half of the transmission data, but no error occurs in the remaining divided frames of the first and last half of the transmission data. Furthermore, the remaining divided frames having no error are arranged so as to be always the same locations in each burst error cycle, whereby it is possible to substantially improve an error correcting capability.

In the case shown in FIG. 12A, it is possible to perform accurate error correction by the frame reconstructed from a third group shown in part (c3) of FIG. 12A and the frame reconstructed from a fourth group shown in part (c4) of FIG. 12A with respect to the first and last half of the transmission data, respectively. Thus, it is possible to determine that these frames are reception data. In other words, in this example, it is possible to transmit and receive correct data by only one packet transmission even if there occurs a long burst error of 6 bytes, and transmission efficiency is increased by about 1.8 (=24B/13B) times compared to the first embodiment because the data is repeated only once (part (a) of FIG. 13).

Also, FIGS. 12B and 12C show a case where a burst error (part (b) of FIG. 12B and part (b) of 12C) whose cycle T and length are 12 bytes and 9 bytes, respectively, occurs when a packet (part (a) of FIG. 12B and part (a) of FIG. 12C) in which one divided frame (three bytes) of the first half of the transmission data and one divided frame (three bytes) of the last half of the transmission data are alternately repeated is transmitted. A phase of the packet has no correlation to a phase of the burst error. In FIG. 12B, the same divided frame of the first half of the transmission data and the same divided frame of the last half of the transmission data are alternately repeated once in one burst cycle, and many errors occur in any three consecutive divided frames of the first and last half of the transmission data. Thus, there occurs an error in the divided frames of the first half of the transmission data. In this case, only the last half of the transmission data is stored in the storage area of the receiver 7, and the first half of the transmission data is retransmitted. In FIG. 12C, as is the case with the FIG. 12B, there occurs many burst errors in any three consecutive three divided frames, but retransmission is performed for only the divided frames of the first half of the transmission data. Thus, it is possible to receive the divided frames of the first half of the transmission data, in which no error occurs.

In the case shown in FIGS. 12B and 12C, it is possible to perform accurate error correction by the frame reconstructed from a fourth group shown in part (c4) of FIG. 12C and the frame reconstructed from a fourth group shown in part (c4) of FIG. 12B with respect to the first and last half of the transmission data, respectively. Thus, it is possible to determine that these frames are reception data. In other words, in this example, it is possible to transmit and receive correct data by performing packet transmission twice in a case where there occurs a long burst error of 9 bytes, and transmission efficiency is almost equal to the first embodiment (part (b) of FIG. 13).

As described above, by the communication device and the communication method according to the second embodiment of the present invention, it is possible to improve transmission efficiency in a case where a length of a burst error is shorter than the first embodiment, and keep a burst error tolerance equivalent to the first embodiment by a retransmission process in a case where a length of a burst error is longer than the first embodiment, without the need for a special component for detecting a cycle of the burst error.

Note that a data length of the transmission data to which the present invention can be applied is not limited to those described in the first and second embodiments. The same effect as described in the above embodiments can be obtained in a case where the present invention is applied to the data communications in which a different length of transmission data is transmitted. Also, an error detecting code and an error correcting code are not limited to those described in the first and second embodiments. For example, an error correcting code may be selected from among a BCH code, a Reed-Solomon code, and a Viterbi code, etc., in view of the throughput and a correcting capability. Furthermore, the present invention can be flexibly applied to a communication system in which the burst error cycle T, the transmission speeds, the number n, and the dividing number m are different from those described in the above embodiments.

Also, in the receivers 3 and 7 described in the above first and second embodiments, respectively, it is assumed that the error correcting process and the error detecting process are performed for each error correcting frame, and the transmission data is transferred to the control sections 31 and 71 as the reception data if there is no error in the transmission data. However, in a case where noise immunity to a burst error is negligible, only the error detecting process may be performed without performing the error correcting process for transferring the transmission data to the control sections 31 and 71 as the reception data if there is no error in the transmission data. Also, only the error correcting process may be performed for transferring the transmission data to which the error correcting process is performed to the control sections 31 and 71 as the reception data. Furthermore, the error correcting coding performed in the transmitters 2 and 6 is not necessarily performed, and it is possible to obtain the useful effects of the present invention in a case where only the error detecting coding is performed.

Also, in the above second embodiment, a code indicating a data length, which is added to the transmission data, is omitted. However, a code indicating a data length of effective data is added as the code indicating a data length, thereby enabling a following telegraphic message receiving method. A case where effective data of 11 bytes is transmitted by a frame of a fixed length (in the above embodiments, 30 bytes) will be taken as an example. In this case, a code of one byte indicating a length of effective data is added to the effective data of 11 bytes, and a dummy telegraphic message of 12 bytes is added for fixed length frame transmission. Then, the resultant data of 24 bytes is split into a first half of data and a last half of data, and transmitted in accordance with the transmission method as described in the above embodiment. The receiver receives the transmission telegraphic message including the code indicating the effective data length, and performs the error correcting process and the error detecting process for the error correcting frame of the first half of data. Then, the receiver determines that the effective data is included only in the first half of data based on the code indicating the effective data length added to the processed first half of data, and does not perform the error correcting process and the error detecting process for the error correcting frame of the last half of data, which contains the division information and the dummy telegraphic message. If the above telegraphic message receiving method is used, a retransmission process for the frame having no effective data is not required, thereby improving transmission efficiency.

While the invention has been described in detail, the foregoing description is in all aspects illustrative and not restrictive. It is understood that numerous other modifications and variations can be devised without departing from the scope of the invention.

What is claimed is:

1. A transmitter for transmitting data to a receiver, comprising:
    a frame generating section for generating at least one predetermined frame by performing at least an error detecting code generating process for data to be transmitted;
    a frame dividing section for dividing the at least one frame generated by the frame generating section into a plurality of divided frames, based on a cycle of a burst error whose cyclical occurrence in a course of transmission is predictable; and
    a transmission control section for generating a packet in which each of the plurality of divided frames obtained by the frame dividing section is copied at least once in one cycle of the burst error for transmission, and transmitting the packet to the receiver.

2. The transmitter according to claim 1, wherein
    the frame generating section performs at least the error detecting code generating process for the data to be transmitted, and generates one frame of L length,
    the frame dividing section divides the frame of L length generated by the frame generating section, by a length T/n which is obtained by dividing the predicted burst error cycle T by n, which is an integer equal to or greater than two, into n×L/T divided frames, and
    the transmission control section generates a packet in which each of the n×L/T divided frames obtained by the frame dividing section is sequentially transmitted n times in one cycle of the burst error.

3. The transmitter according to claim 1, wherein
    the frame generating section divides the data to be transmitted into m, which is a natural number, pieces of data, and generates m frames of L length by performing at least the error detecting code generating process for each of the m pieces of data to which division information indicating division order is further added,
    the frame dividing section divides each of the m frames of L length generated by the frame generating section, by a length T/n which is obtained by dividing the predicted burst error cycle T by n, which is an integer equal to or greater than two, into n×L/T divided frames, and
    the transmission control section generates a packet in which each of the m×n×L/T divided frames obtained by the frame dividing section is discontinuously transmitted n/m times in one cycle of the burst error.

4. The transmitter according to claim 3, further comprising a frame storing section for storing the m frames, which are generated by the frame generating section and divided by the frame dividing section, by copying each of the m frames n/m times in order from a first frame to an mth frame, and storing a matrix of divided frames with n rows and n×L/T columns, wherein
    the transmission control section sequentially obtains the divided frame from the matrix of divided frames, which is stored in the frame storing section, by performing column-wise interlacing from a first row and first column to a n row and n×L/T column, and generates a packet including the divided frames in an order in which the divided frames are obtained.

5. The transmitter according to claim 3, wherein
    when a request to retransmit a specific frame is received from the receiver, the transmission control section generates a packet in which the divided frames contained in the specific frame are sequentially transmitted n times in one cycle of the burst error.

6. The transmitter according to claim 1, wherein the frame generating section generates at least one predetermined frame by performing the error detecting code generating process and an error correcting code generating process for data to be transmitted.

7. A receiver for receiving data from a transmitter, comprising:
    a reception control section for receiving a packet, in which a same divided frame is copied at least once and transmitted, in one cycle of a burst error whose cyclical occurrence in a course of transmission is predictable, and sequentially distributing a plurality of divided frames contained in the packet, from a first divided frame, in a cyclical manner into a plurality of groups corresponding to the number of copies of the same divided frame;
    a frame reconstructing section for reconstructing a plurality of frames by assembling the distributed divided frames with respect to each of the plurality of groups of the reception control section, and
    a frame processing section for performing at least an error detecting process for each of the plurality of frames reconstructed by the frame reconstructing section, and processing data stored in a frame having no error as reception data.

8. The receiver according to claim 7, wherein
    the reception control section receives a packet in which a same divided frame is sequentially transmitted n, which is an integer equal to or greater than two, times in one cycle of the burst error, and cyclically distributes a plurality of divided frames contained in the packet, from a first divided frame, into first to nth groups,
    the frame reconstructing section reconstructs n frames by assembling the distributed divided frames with respect to each of the first to nth groups, and
    the frame processing section performs at least the error detecting process for each of n frames reconstructed by the frame reconstructing section, and processes data stored in a frame having no error as reception data.

9. The receiver according to claim 7, wherein
    the reception control section receives a packet in which m, which is a natural number, types of divided frames are discontinuously transmitted n/m times in one cycle of the burst error, and sequentially distributes a plurality of divided frames contained in the packet, from a first divided frame, into first to nth groups in a cyclical manner,
    the frame reconstructing section reconstructs n, which is an integer equal to or greater than two, frames by assembling the distributed divided frames with respect to each of the first to nth groups, and
    the frame processing section performs at least the error detecting process for each of the n frames reconstructed by the frame reconstructing section, and processes data stored in a frame having no error as reception data.

10. The receiver according to claim 9, further comprising a data processing section for determining whether or not the reception data processed by the frame processing section includes all data transmitted by the transmitter, and requiring the transmitter to retransmit a frame including lost data, if any.

11. The receiver according to claim 7, wherein the frame processing section performs the error detecting process and an error correcting process for each of the plurality of frames reconstructed by the frame reconstructing section, and processes data stored in a frame having no error as reception data.

12. A communication device for performing data transmission and reception, wherein
a transmitter includes:
a frame generating section for generating at least one predetermined frame by performing at least an error detecting code generating process for data to be transmitted;
a frame dividing section for dividing the at least one frame generated by the frame generating section into a plurality of divided frames, based on a cycle of a burst error whose cyclical occurrence in a course of transmission is predictable; and
a transmission control section for generating a packet in which each of the plurality of divided frames obtained by the frame dividing section is copied at least once in one cycle of the burst error for transmission, and transmitting the packet to a receiver, and
the receiver includes:
a reception control section for receiving a packet from the transmission control section of another communication device, and cyclically distributing a plurality of divided frames contained in the packet, from a first divided frame, into a plurality of groups corresponding to the number of copies of each of the plurality of divided frames;
a frame reconstructing section for reconstructing a plurality of frames by assembling the distributed divided frames with respect to each of the plurality of groups of the reception control section; and
a frame processing section for performing at least an error detecting process for each of the plurality of frames reconstructed by the frame reconstructing section, and processing data stored in a frame having no error as reception data.

13. The communication device according to claim 12, wherein
the frame generating section performs at least the error detecting code generating process for the data to be transmitted, and generates one frame of L length,
the frame dividing section divides the frame of L length generated by the frame generating section, by a length T/n which is obtained by dividing the predicted burst error cycle T by n, which is an integer equal to or greater than two, into n×L/T divided frames,
the transmission control section generates a packet in which each of the n×L/T divided frames obtained by the frame dividing section is sequentially transmitted n times in one cycle of the burst error,
the reception control section receives a packet in which a same divided frame is sequentially transmitted n times in one cycle of the burst error, and cyclically distributes a plurality of divided frames contained in the packet, from a first divided frame, into first to nth groups,
the frame reconstructing section reconstructs n frames by assembling the distributed divided frames with respect to each of the first to nth groups, and
the frame processing section performs at least the error detecting process for each of n frames reconstructed by the frame reconstructing section, and processes data stored in a frame having no error as reception data.

14. The communication device according to claim 12, wherein
the frame generating section divides the data to be transmitted into m, which is a natural number, pieces of data, and generates m frames of L length by performing at least the error detecting code generating process for each of the m pieces of data to which division information indicating division order is further added,
the frame dividing section divides each of the m frames of L length generated by the frame generating section, by a length T/n which is obtained by dividing the predicted burst error cycle T by n, which is an integer equal to or greater than two, into n×L/T divided frames, and
the transmission control section generates a packet in which each of the m×n×L/T divided frames obtained by the frame dividing section is discontinuously transmitted n/m times in one cycle of the burst error,
the reception control section receives a packet in which m types of divided frames are discontinuously transmitted n/m times in one cycle of the burst error, and sequentially distributes a plurality of divided frames contained in the packet, from a first divided frame, into first to nth groups in a cyclical manner,
the frame reconstructing section reconstructs n frames by assembling the distributed divided frames with respect to each of the first to nth groups, and
the frame processing section performs at least the error detecting process for each of the n frames reconstructed by the frame reconstructing section, and processes data stored in a frame having no error as reception data.

15. The communication device according to claim 12, wherein
the frame generating section generates at least one predetermined frame by performing the error detecting code generating process and an error correcting code generating process for data to be transmitted, and
the frame processing section performs the error detecting process and an error correcting process for each of the plurality of frames reconstructed by the frame reconstructing section, and processes data stored in a frame having no error as reception data.

16. A communication method for performing data transmission and reception, comprising:
on a transmitting side,
a generating step of generating at least one predetermined frame by performing at least an error detecting code generating process for data to be transmitted;
a dividing step of dividing the at least one frame generated at the frame generating step into a plurality of divided frames, based on a cycle of a burst error whose cyclical occurrence in a course of transmission is predictable; and
a transmitting step of generating a packet in which each of the plurality of divided frames obtained at the frame dividing step is copied at least once in one cycle of the burst error for transmission, and transmitting the packet to a receiving side, and on the receiving side,
a receiving step of receiving the packet transmitted from the transmitting step on the transmitting side, and cyclically distributing a plurality of divided frames contained in the packet, from a first divided frame, into a plurality of groups corresponding to a number of copies of each of the plurality of divided frames;
a reconstructing step of reconstructing a plurality of frames by assembling the divided frames distributed at the receiving step with respect to each of the plurality of groups; and
a processing step of performing at least an error detecting process for each of the plurality of frames reconstructed at the frame reconstructing step, and processing data stored in a frame having no error as reception data.

17. The communication method according to claim 16, wherein
the generating step performs at least the error detecting code generating process for the data to be transmitted, and generates one frame of L length,
the dividing step divides the frame of L length generated at the generating step, by a length T/n which is obtained by dividing the predicted burst error cycle T by n, which is an integer equal to or greater than two, into n×L/T divided frames,
the transmitting step generates a packet in which each of the n×L/T divided frames obtained at the dividing step is sequentially transmitted n times in one cycle of the burst error,
the receiving step receives a packet in which a same divided frame is sequentially transmitted n times in one cycle of the burst error, and cyclically distributes a plurality of divided frames contained in the packet, from a first divided frame, into first to nth groups,
the reconstructing step reconstructs n frames by assembling the distributed divided frames with respect to each of the first to nth groups, and
the processing step performs at least the error detecting process for each of the n frames reconstructed at the frame reconstructing step, and processes data stored in a frame having no error as reception data.

18. The communication method according to claim 16, wherein
the generating step divides the data to be transmitted into m, which is a natural number, pieces of data, and generates m frames of L length by performing at least the error detecting code generating process for each of the m pieces of data to which division information indicating division order is further added,
the dividing step divides each of the m frames of L length generated at the generating step, by a length T/n which is obtained by dividing the predicted burst error cycle T by n, which is an integer equal to or greater than two, into n×L/T divided frames,
the transmitting step generates a packet in which each of the m×n×L/T divided frames obtained at the dividing step is discontinuously transmitted n/m times in one cycle of the burst error,
the receiving step receives a packet in which m types of divided frames are discontinuously transmitted n/m times in one cycle of the burst error, and sequentially distributes a plurality of divided frames contained in the packet, from a first divided frame, into first to nth groups in a cyclical manner,
the reconstructing step reconstructs n frames by assembling the distributed divided frames with respect to each of the first to nth groups, and
the processing step performs at least the error detecting process for each of the n frames reconstructed at the reconstructing step, and processes data stored in a frame having no error as reception data.

19. The communication method according to claim 16, wherein
the generating step generates at least one predetermined frame by performing the error detecting code generating process and an error correcting code generating process for data to be transmitted, and
the processing step performs the error detecting process and an error correcting process for each of the plurality of frames reconstructed at the frame reconstructing step, and processes data stored in a frame having no error as reception data.

20. A program executed in a transmitter and a receiver, which perform data transmission,
wherein the transmitter is caused to execute:
a generating step of generating at least one predetermined frame by performing at least an error detecting code generating process for data to be transmitted;
a dividing step of dividing the at least one frame generated at the generating step into a plurality of divided frames, based on a cycle of a burst error whose cyclical occurrence in a course of transmission is predictable; and
a transmitting step of generating a packet in which each of the plurality of divided frames obtained at the dividing step is copied at least once in one cycle of the burst error for transmission, and transmitting the packet to a receiving side, and
wherein the receiver is caused to execute:
a receiving step of receiving the packet transmitted from the transmitting step on a transmitting side, and cyclically distributing a plurality of divided frames contained in the packet, from a first divided frame, into a plurality of groups corresponding to a number of copies of each of the plurality of divided frames;
a reconstructing step of reconstructing a plurality of frames by assembling the divided frames distributed at the receiving step with respect to each of the plurality of groups; and
a processing step of performing at least an error detecting process for each of the plurality of frames reconstructed at the reconstructing step, and processing data stored in a frame having no error as reception data.

21. The program according to claim 20, wherein
the generating step performs at least the error detecting code generating process for the data to be transmitted, and generates one frame of L length,
the dividing step divides the frame of L length generated at the generating step, by a length T/n which is obtained by dividing the predicted burst error cycle T by n, which is an integer equal to or greater than two, into n×L/T divided frames,
the transmitting step generates a packet in which each of the n×L/T divided frames obtained at the dividing step is sequentially transmitted n times in one cycle of the burst error,
the receiving step receives a packet in which a same divided frame is sequentially transmitted n times in one cycle of the burst error, and cyclically distributes a plurality of divided frames contained in the packet, from a first divided frame, into first to nth groups, the reconstructing step reconstructs n frames by assembling the distributed divided frames with respect to each of the first to nth groups, and the processing step performs at least the error detecting process for each of n frames reconstructed at the reconstructing step, and processes data stored in a frame having no error as reception data.

22. The program according to claim 20, wherein the generating step divides the data to be transmitted into m, which is a natural number, pieces of data, and generates m frames of L length by performing at least the error detecting code generating process for each of the m pieces of data to which division information indicating division order is further added, the dividing step divides each of the m frames of L length generated at the generating step, by a length T/n which is obtained by dividing the predicted burst error cycle T by n, which is an integer equal to or greater than two, into n×L/T divided frames, the transmitting step generates a packet in which each of the m×n×L/T divided frames obtained at the dividing step is discontinuously transmitted n/m times in one cycle of the burst error, the receiving step receives a packet in which m types of divided frames are discontinuously transmitted n/m times in one cycle of the burst error, and sequentially distributes a plurality of divided frames contained in the packet, from a first divided frame, into first to nth groups in a cyclical manner, the reconstructing step reconstructs n frames by assembling the distributed divided frames with respect to each of the first to nth groups, and the processing step performs at least the error detecting process for each of the n frames reconstructed at the reconstructing step, and processes data stored in a frame having no error as reception data.

23. The program according to claim 20, wherein the generating step generates at least one predetermined frame by performing the error detecting code generating process and an error correcting code generating process for data to be transmitted, and the processing step performs the error detecting process and an error correcting process for each of the plurality of frames reconstructed at the reconstructing step, and processes data stored in a frame having no error as reception data.

24. A storage medium in which a program executed in a transmitter and a receiver, which perform data transmission, is stored, wherein the program causes the transmitter to perform:
- a generating step of generating at least one predetermined frame by performing at least an error detecting code generating process for data to be transmitted;
- a dividing step of dividing the at least one frame generated at the frame generating step into a plurality of divided frames, based on a cycle of a burst error whose cyclical occurrence in a course of transmission is predictable; and
- a transmitting step of generating a packet in which each of the plurality of divided frames obtained at the dividing step is copied at least once in one cycle of the burst error for transmission, and transmitting the packet to a receiving side, wherein the program causes the receiver to perform:
- a receiving step of receiving the packet transmitted from the transmitting step on a transmitting side, and cyclically distributing a plurality of divided frames contained in the packet, from a first divided frame, into a plurality of groups corresponding to a number of copies of each of the plurality of divided frames;
- a reconstructing step of reconstructing a plurality of frames by assembling the divided frames distributed at the receiving step with respect to each of the plurality of groups; and
- a processing step of performing at least an error detecting process for each of the plurality of frames reconstructed at the reconstructing step, and processing data stored in a frame having no error as reception data.

25. The storage medium according to claim 24, wherein the generating step performs at least the error detecting code generating process for the data to be transmitted, and generates one frame of L length, the dividing step divides the frame of L length generated at the generating step, by a length T/n which is obtained by dividing the predicted burst error cycle T by n, which is an integer equal to or greater than two, into n×L/T divided frames, the transmitting step generates a packet in which each of the n×L/T divided frames obtained at the dividing step is sequentially transmitted n times in one cycle of the burst error, the receiving step receives a packet in which a same divided frame is sequentially transmitted n times in one cycle of the burst error, and cyclically distributes a plurality of divided frames contained in the packet, from a first divided frame, into first to nth groups, the reconstructing step reconstructs n frames by assembling the distributed divided frames with respect to each of the first to nth groups, and the processing step performs at least the error detecting process for each of n frames reconstructed at the reconstructing step, and processes data stored in a frame having no error as reception data.

26. The storage medium according to claim 24, wherein the generating step divides the data to be transmitted into m, which is a natural number, pieces of data, and generates m frames of L length by performing at least the error detecting code generating process for each of the m pieces of data to which division information indicating division order is further added, the dividing step divides each of the m frames of L length generated at the generating step, by a length T/n which is obtained by dividing the predicted burst error cycle T by n, which is an integer equal to or greater than two, into n×L/T divided frames, the transmitting step generates a packet in which each of the m×n×L/T divided frames obtained at the dividing step is discontinuously transmitted n/m times in one cycle of the burst error, the receiving step receives a packet in which in types of divided frames are discontinuously transmitted n/m times in one cycle of the burst error, and sequentially distributes a plurality of divided frames included in the packet, from a first divided frame, into first to nth groups in a cyclical manner, the reconstructing step reconstructs n frames by assembling the distributed divided frames with respect to each of the first to nth groups, and the processing step performs at least the error detecting process for each of the n frames reconstructed at the reconstructing step, and processes data stored in a frame having no error as reception data.

27. The storage medium according to claim 24, wherein the generating step generates at least one predetermined frame by performing the error detecting code generating process and an error correcting code generating process for data to be transmitted, and the processing step performs the error detecting process and an error correcting process for each of the plurality of frames reconstructed at the reconstructing step, and processes data stored in a frame having no error as reception data.

* * * * *

UNITED STATES PATENT AND TRADEMARK OFFICE
CERTIFICATE OF CORRECTION

PATENT NO.        : 7,096,405 B2                                              Page 1 of 1
APPLICATION NO. : 10/690561
DATED             : August 22, 2006
INVENTOR(S)       : Akio Kurobe et al.

It is certified that error appears in the above-identified patent and that said Letters Patent is hereby corrected as shown below:

In column 24, line 57, please replace "in which in types" with --in which m types--.

Signed and Sealed this

Thirtieth Day of January, 2007

JON W. DUDAS
*Director of the United States Patent and Trademark Office*